United States Patent [19]

Leverett

[11] 4,273,649
[45] Jun. 16, 1981

[54] APPARATUS AND PROCESS FOR WEIGHING ARTICLES SUCCESSIVELY

[76] Inventor: William H. Leverett, P.O. Box 1404, LaGrange, Ga. 30241

[21] Appl. No.: 963,581

[22] Filed: Nov. 24, 1978

[51] Int. Cl.³ .............................................. B07C 5/16
[52] U.S. Cl. ................................. 209/539; 209/564; 209/592; 209/934; 209/644; 209/912; 209/914; 209/924; 198/604; 198/626; 198/817
[58] Field of Search ............... 209/592, 593, 594, 595, 209/559, 563, 564, 565, 539, 934, 644, 912, 914, 924, 586; 198/604, 626, 817

[56] References Cited

U.S. PATENT DOCUMENTS

| | | | |
|---|---|---|---|
| 3,035,696 | 5/1962 | Campbell | 209/595 |
| 3,101,836 | 8/1963 | Rountree, Jr. | 198/817 X |
| 3,142,383 | 7/1964 | Boyer | 209/586 |
| 3,206,022 | 9/1965 | Roberts, Sr. | 209/912 X |
| 3,244,278 | 4/1966 | Weprin et al. | 209/595 |
| 3,867,283 | 2/1975 | Horn | 209/592 X |
| 3,974,888 | 8/1976 | Murakami | 209/565 X |
| 4,106,628 | 8/1978 | Warkentin et al. | 209/593 X |

Primary Examiner—Allen N. Knowles
Attorney, Agent, or Firm—Newton, Hopkins & Ormsby

[57] ABSTRACT

An article weighing machine having a turntable with fixed rakes for directing articles, i.e., fruits or vegetables, on the turntable along prescribed paths into side-by-side metering assemblies where successive articles are placed in successive pockets formed by opposed fingers on continuous chains, the fingers moving in linear parallel paths above cooperating parallel feed belts. Brushes over the entrance and exit of each assembly engages each article as it enters and leaves the fingers. The parallel belts receive the successive, equally spaced articles thereon and transport them successively to weighing cells where such articles are individually weighed and analog signals corresponding to the weight of the individual article are fed to a control logic which then converts such signals to digital form and transfers the logic output to a computer. The speed of the feed belt is also fed to the computer which signals as a function of the weight the opening of a selected air nozzle, of a series of longitudinally spaced air nozzles, when the individual article has been transported to the vicinity of such air nozzle, whereby the air blows the article laterally off of the belt and onto a discharge belt, feeding to a container positioned by a container conveyor to receive the articles. When the computer totals the appropriate weight for a given container, the conveyor is indexed.

35 Claims, 13 Drawing Figures

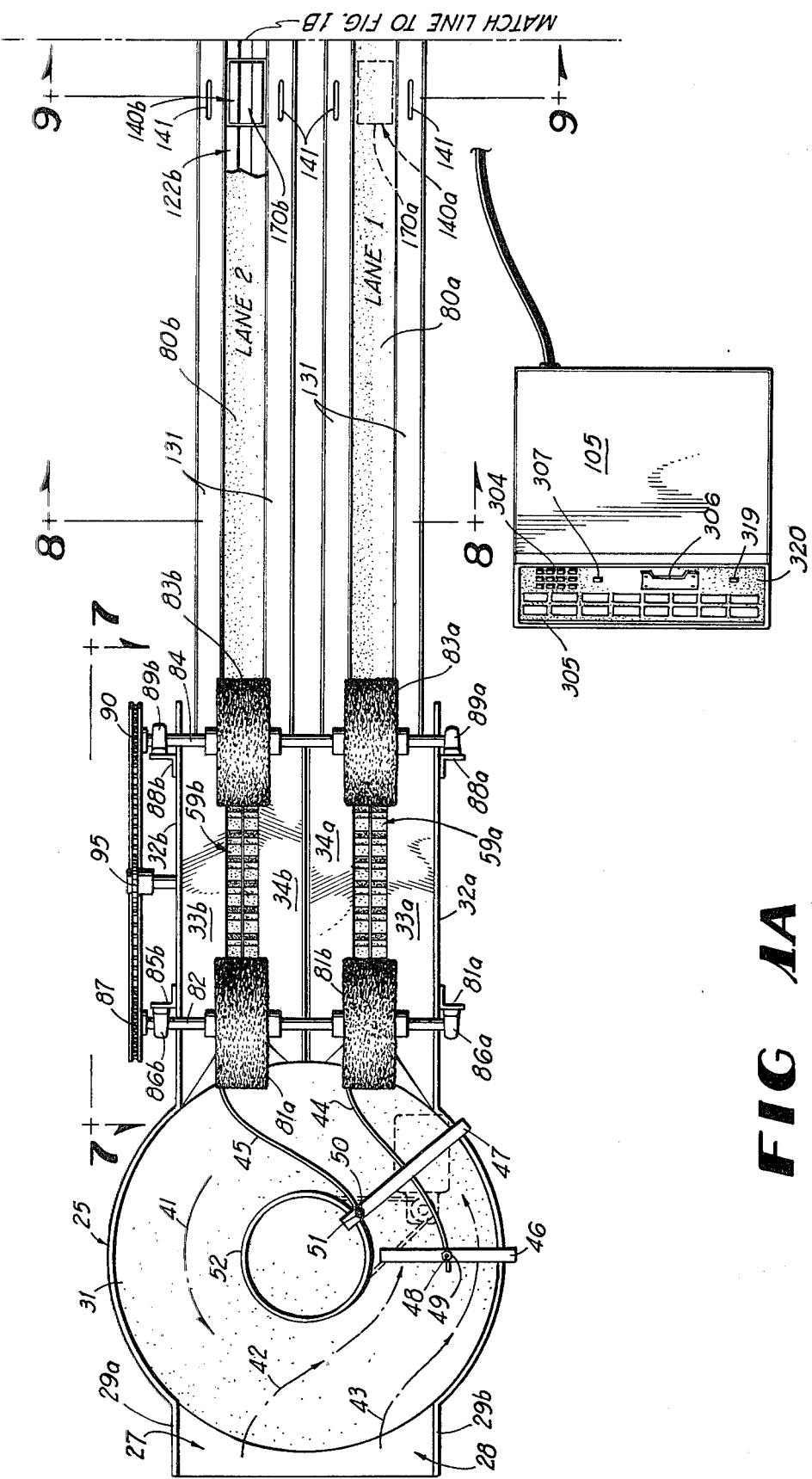

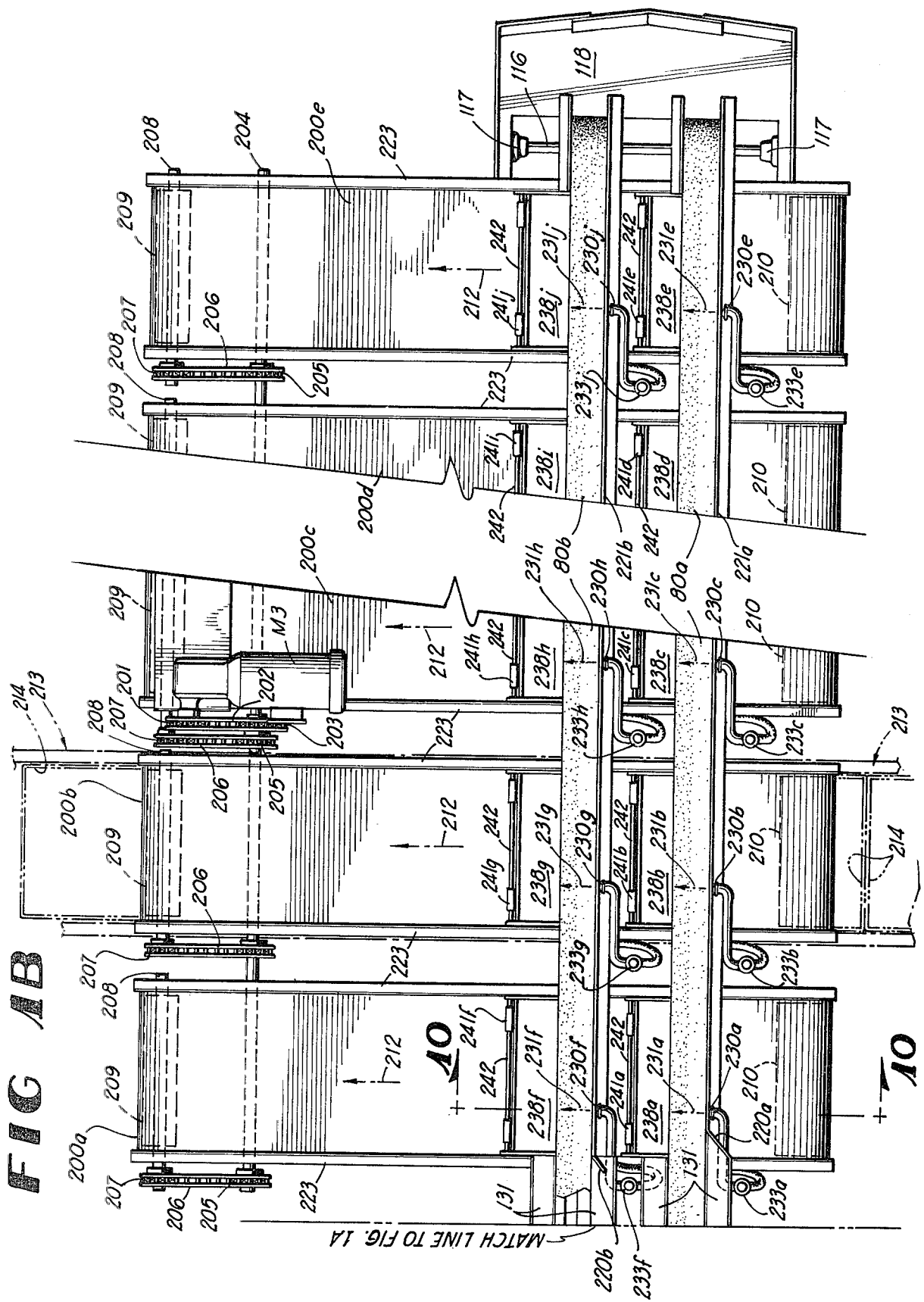

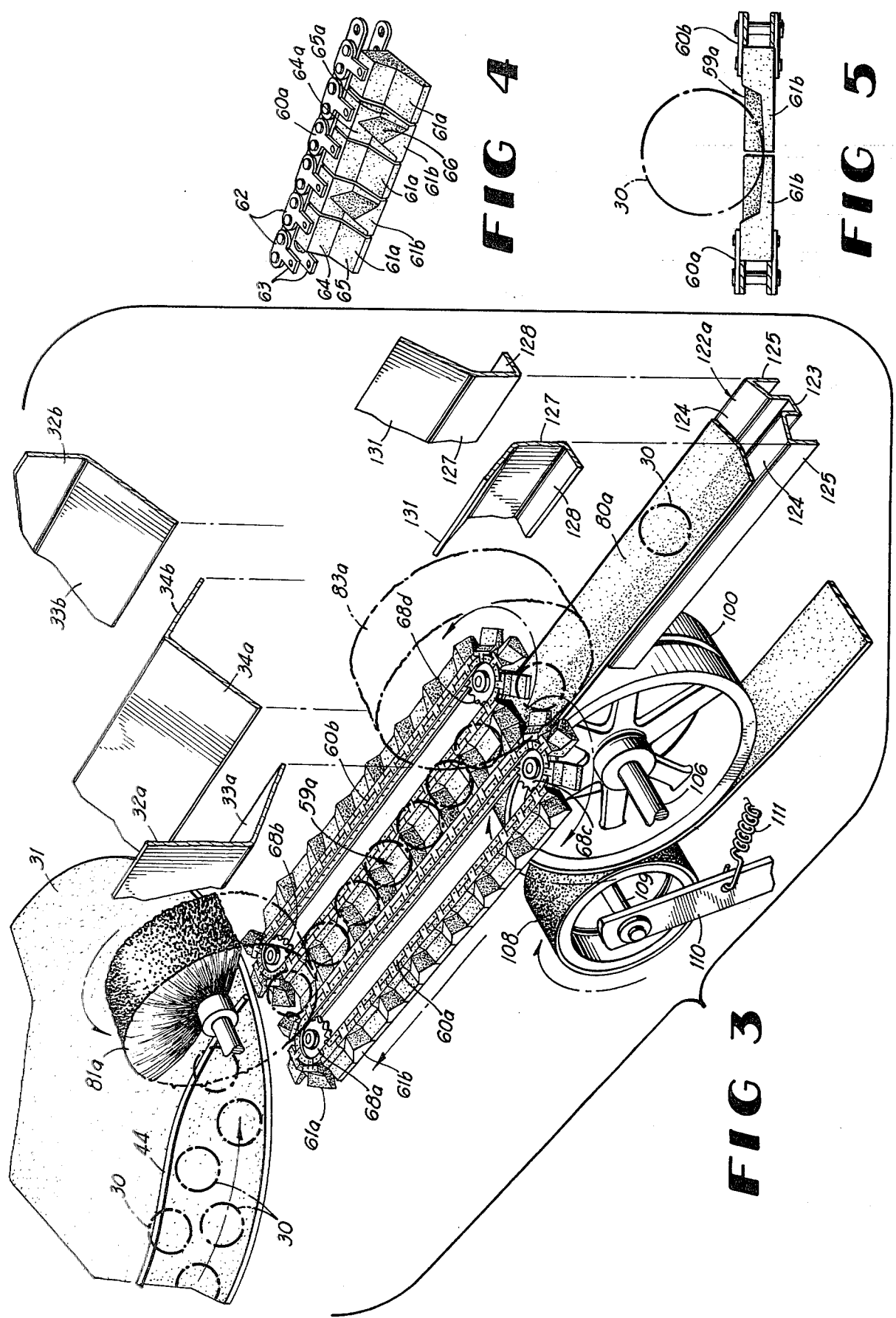

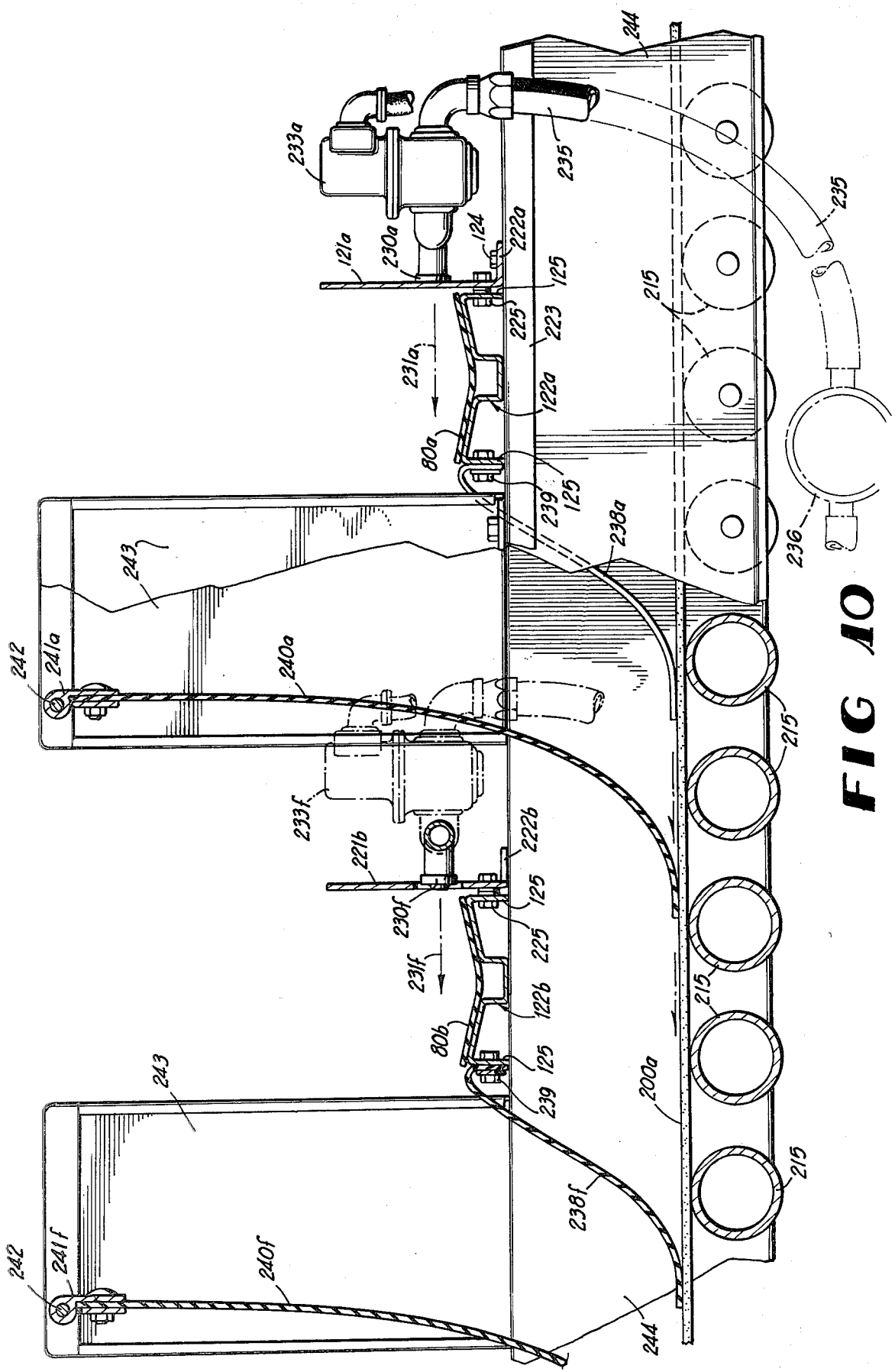

APPARATUS AND PROCESS FOR WEIGHING ARTICLES SUCCESSIVELY

BACKGROUND OF THE INVENTION

1. Field of the Invention

This invention relates to an automatic programmable article weighing device and is more particularly concerned with an apparatus and method for sorting articles according to their respective physical characteristics, such as weight and filling containers with a prescribed number of articles or a prescribed weight of articles.

2. Background of the Invention

In the past numerous machines have been devised for weighing or sizing and bagging fruits and vegetables so as to provide bags of uniform minimum weight. Such prior fruit weighing devices usually weigh the individual container as it is being filled and then blocks the feed of articles to the container until another container is in place. Usually, such devices do not weigh the individual articles themselves, nor are they capable of accurate weighing. Instead, they assure that at least a minimum prescribed weight is attained.

Other prior art devices include a series of cups in which successive fruit are deposited. Weighing is accomplished by weighing both the cup and the fruit. The back end of the cup is lowered to discharge the fruit onto the take-away belts; however, the fruit must clear the let-down cup. This calls for about twice the distance between the height of the take-away belts and the fruit when it is being weighed. This greater height causes more bruising of the fruit than when the take-away belts are located higher. It is also difficult to keep doubles out of the cups. This causes inaccurate weight.

On weight sizers using cups, the cup is mounted on a carrier rod near the front of the cup. When a pear or a pear-shaped apple, for example, falls into the cup with its heavy end toward the rod, the device will indicate that the fruit weighs less than when the heavy end falls toward the back side of the cup.

In still other types of sizing devices, the fruits are sized but not weighed. Such sizing devices attempt to separate the fruit according to diameter and drop the same into different storage zones in response thereto.

Each of these prior art devices requires considerable maintenance, may bruise the fruit by rough handling, and is not too accurate in weighing or sizing of the fruit. Furthermore, these prior art devices do not count the number of fruit passing through the machine, weigh and store the weight of each unit, nor do they total the weight or total the number of units for each size of fruit.

SUMMARY OF THE INVENTION

Briefly described, the present invention includes a frame carrying a turntable with fixed rakes for directing articles, i.e., fruits or vegetables, on the turntable in tandem along prescribed paths into side-by-side metering assemblies where successive articles are placed in successive pockets formed by opposed fingers on continuous chains, the fingers moving in linear parallel paths above cooperating feed belts. Brushes arrest the inertia of each article as it is deposited by the fingers on the belt. The belt transports successive equally spaced articles to a weighing cell where such articles are individually weighed and analog signals corresponding to the weights of the individual articles are fed to a control logic which then converts such signals to digital form and transfers the logic output to a computer. The speed of the feed belt is also fed to the computer which signals to open a selected air nozzle in a series of longitudinally spaced air nozzles disposed adjacent the path of travel of the belt. When the individual article has been transported to the vicinity of such air nozzle, the air blows the articles laterally off of the belt and onto a discharge belt feeding to a container positioned by a container conveyor to receive the articles. When the computer totals the appropriate weight for a given container, the container conveyor is indexed.

Accordingly, it is an object of the present invention to provide an article weighing machine which will count each article handled by the machine, weigh each individual article, total the weight according to each size of article and total the number of each article which is fed to a prescribed location.

Another object of the present invention is to provide an article weighing machine which is inexpensive to manufacture, durable in structure and efficient in operation.

Another object of the present invention is to provide an article weighing machine which will quickly, accurately, gently and easily weigh fruits and vegetables so as to deposit prescribed number in prescribed locations.

Another object of the present invention is to provide an article weighing machine which can be readily and easily programmed and reprogrammed so as to distribute the articles to various locations according to weight, as desired.

Another object of the present invention is to provide an article weighing machine which will quite accurately weigh and count the articles which are fed to a prescribed location.

Another object of the present invention is to provide an article weighing machine which will weigh fruits and vegetables with a minimum of bruising of them and without appreciable contact between individual articles.

Another object of the present invention is to provide an article weighing machine which will automatically recycle any articles which missed being weighed or discharged.

Another object of the present invention is to provide an article weighing machine which will accurately weigh any size fruit or vegetable in any position on the belt.

Another object of the present invention is to provide an article weighing machine wherein the discharge position of selected size articles can be readily and easily changed.

Another object of the present invention is to provide an article weighing machine which requires little maintenance.

Another object of the present invention is to provide an article weighing device which will average the weight of each article from a plurality of readings.

Other objects, features, and advantages of the present invention will become apparent from the following description when taken in conjunction with the accompanying drawings wherein like characters of reference designate corresponding parts throughout several views.

BRIEF DESCRIPTION OF THE DRAWING

FIG. 1A is a top plan view of front portion of an article weighing machine constructed in accordance with the present invention;

FIG. 1B is a top plan view of the remaining or rear portion of the article weighing machine of FIG. 1A;

FIG. 3 is an enlarged fragmentary exploded prospective view of the front portion of the article weighing machine depicted in FIG. 1A;

FIG. 4 is an enlarged prospective view of a portion of the conveyor chain and article supporting fingers of the machine depicted in FIG. 1A;

FIG. 5 is an enlarged vertical sectional view showing a portion of the conveyor chains and the fingers of the machine depicted in FIG. 1A;

FIG. 10 is a cross-sectional view taken substantially along line 10—10 in FIG. 1B;

DETAILED DESCRIPTION

Figure 2:
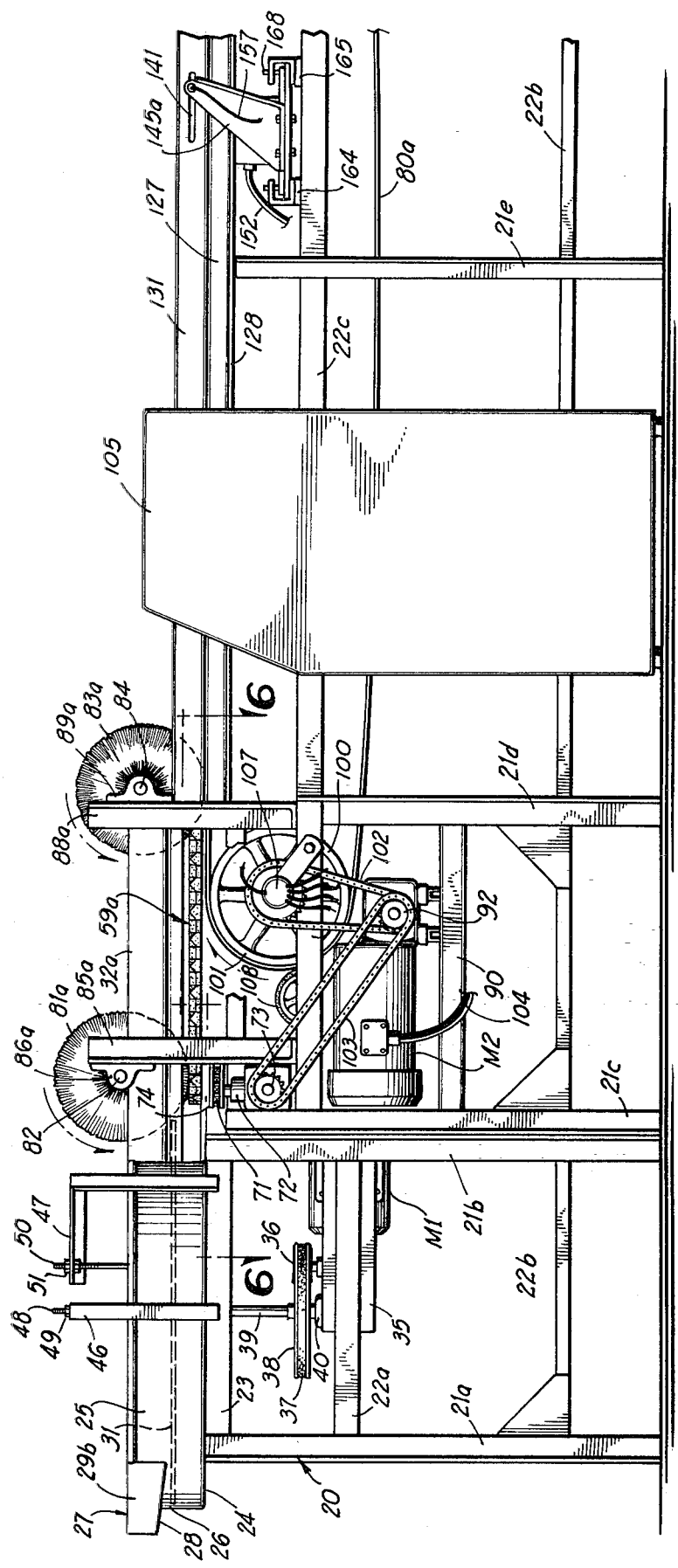
FIG. 2 is a side elevational view of the portion of the article weighing machine disclosed in FIG. 1A.

Referring now in detail to the embodiment chosen for the purpose of illustrating the present invention, numeral 20 in FIG. 2 denotes generally a supporting frame which includes a plurality of spaced parallel upright legs 21a, 21b, 21c, 21d and 21e. The legs are joined by horizontally disposed longitudinally extending bars 22a, 22b and 22c. The legs 22a and 22b form a rectangular frame having an upper frame member 23 which supports a flat circular pan 24. The circular pan has a crescent shaped upstanding sidewall 25, the downstream end of which is open and the upstream end of which is of reduced height to provide chute-supporting ledge 26, seen in FIG. 2. A chute 27 provided with a flat inclined bottom 28 and opposed parallel sidewalls 29a and 29b forms a channel shaped trough on which the articles 30, shown in FIGS. 3 and 5, are fed onto a circular flat turntable 31 carried within the confines of the wall 25.

The wall 25 forms a pair of opposed arcuate concaved sides on laterally opposed sides of the turntable 31, these walls merging at the entrance end with the walls 29a and 29b and merging, toward the exit end of the machine, with parallel upstanding sidewalls 32a and 32b, the lower edges of which are provided with inwardly and downwardly inclined flanges 33a and 33b. Along the central portion of the machine is an invented V-shaped partition defining outwardly and downwardly inclined flanges 34a and 34b, the lower edged of which terminate in spaced relationship to the lower edges of their transversely opposed flanges 33a and 33b.

A motor M1 is mounted on a bracket 35 on frame 20 beneath the turntable 31 and is provided with a pulley 36 which drives, through belt 37, a pulley 38 on the lower end of a turntable shaft 39. The shaft 39 is appropriately journalled by a thrust bearing 40, seen in FIG. 2, the shaft 39 projecting upwardly through the pan 24 and receives the central portion of the turntable 31 so that upon energization of motor M1, the turntable will be rotated in a counterclockwise direction as indicated by the arrow 41 in FIG. 1A. The rotation of the turntable 31 will direct the articles 30 along paths depicted by the arrows 42 and 43 in FIG. 1A.

As a means for directing the articles 30 onto the side-by-side metering assemblies 59a and 59b, there are a pair of fixed rakes 44 and 45 over turntable 31 which are respectively supported by means of L-shaped brackets 46 and 47 which are fixed to the wall 25 by the lower end of one arm which project upwardly and then inwardly over the turntable 31. The outer rake 34 is supported from the bracket 46 by means of an upstanding bolt 48 secured by its lower end to the forward portion of the rake 44 and having an upper end which projects through a hole in the bracket 46. The bolt 48 is adjustable vertically by means of nuts 49. In like fashion, the rake 45 is supported by an upstanding bolt 50 which is adjustably fixed to the bracket 47 by nuts 51.

The bolt 50 also supports a central cylindrical guide ring or inner wall member 52 in spaced relationship above the turntable 31. The function of the ring 52 is to prevent the articles 30 from congregating in the central portion of the turntable 31.

The wall 25 and the rake 44 form a passageway through which the articles 30 are fed onto an associated metering assembly 59a. In like fashion, the rake 44 and rake 45 define a passageway for additional articles of 30, directing them onto a second metering assembly 59b which is juxtaposed with the first metering assembly 59a so as to provide a pair of spaced parallel linear article transporting members through which successive articles are carried.

In more detail, the outer metering assembly 59a includes a pair of opposed spaced parallel horizontally disposed continuous chains 60a and 60b, each of which carries a continuous series of outwardly projecting fingers 61a and 61b, best seen in FIG. 4. The chains 60a and 60b are each of identical construction, having a plurality of juxtaposed links 62 provided with outwardly projecting opposed pairs of brackets 63 vertically spaced from each other.

Each pair of brackets 63 supports a single finger 61a or 61b, as shown in FIG. 4. The article support finger 61a is rectangular when viewed from the top but has a sidewall 64 and a bottom wall 65 which converge to a common edge, the sidewall 64 being inclined at a greater angle to the horizontal than the bottom wall 65.

Each finger 61b includes a sidewall 64a which is parallel to the sidewall 64 and the bottom wall 65a which is parallel to the bottom walls 65; however, there is an upstanding partition member 66, which is triangular in cross-section and is integrally formed with the bottom 65a, to provide upwardly tapering flat surfaces which terminate at about the upper surface or side of the finger 61b. Thus, along the entire flight of chain 60a or 60b, there are fingers 61a sandwiched between and in juxtaposition with fingers 61b so that there is alternately a finger 61a and a finger 61b etc. The fingers 61a on the inner flight of chain 60a are opposite fingers 61a on the inner flight of chain 60b, as are the fingers 61b. Thus, the adjacent surfaces of four fingers 61a and 61b form an upwardly opening cup for receiving the articles 30 when the inner flights of chains 60a and 60b are disposed in parallel relationship to each other, fingers 61a, 61b are generally in a common horizontal plane, and the ends of fingers 61a of the chain 60a and the ends of fingers 61a of the chain 60b are closely adjacent each other. Furthermore, the ends of fingers 61b of the inner flight of chain 60a are closely adjacent the fingers 61b of the chain 60b. By such arrangements, a plurality of juxtaposed linearly disposed segmented cups which progressively move downstream are provided in which an opposed pair of fingers 61b form the front side of the cup and an opposed pair of fingers 61b form the rear portion of the cup, while an opposed pair of fingers 61a disposed therebetween, form the bottom portion of the cup. Of course, as the cups thus formed are advanced to the end of the travel of the inner flights of chains 60a and 60b, they move in an arcuate path away from each other so as to progressively release successive articles 30 as depicted in FIG. 30.

Figure 6:
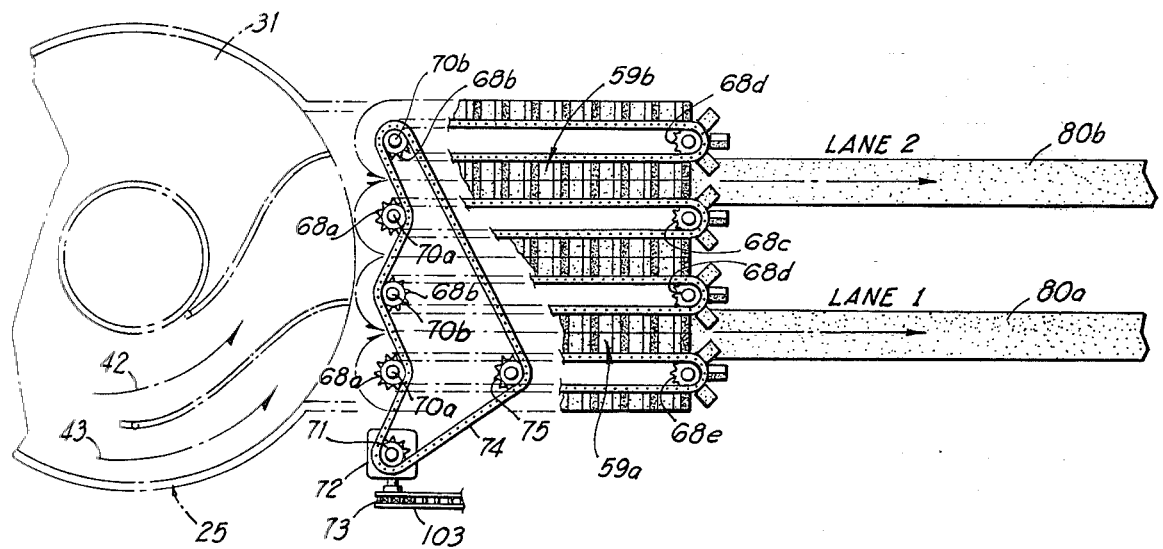
FIG. 6 is an enlarged horizontal sectional view taken substantially along line 6—6 in FIG. 2.

For driving the chains 60a and 60b in their horizontal paths, transversely aligned sprockets 68a and 68b are disposed adjacent to the discharge end of the turntable 31 while transversely aligned opposed pairs of sprockets 68c and 68d are disposed in longitudinal alignment with sprockets 68a, 68b, for receiving the opposite end portions of the chains 60a and 60b, downstream from the sprockets 68a and 68b. The sprockets 68a and 68b are respectively carried by vertically disposed upstanding stud shafts 70a, 70b appropriately journalled by the frame 20. A drive sprocket 71 carried by a gear box 72 and driven through appropriate gearing by a sprocket 73, drives a chain 74 which passes around the downstream side of the sprockets 68a and the upstream side of the sprockets 68b and thence around an idler sprocket 75, best seen in FIG. 6.

It is now seen that the cups or pockets formed by the transversely opposed pairs of fingers 61a and 61b receive successive articles 30, as illustrated in FIG. 3, thereon and evenly space and convey these articles 30 in a downstream direction so as to successively release them in even spacing onto feed belts 80a and 80b which respectively form lanes 1 and 2 feeding them in longitudinal parallel paths. The articles 30 are fruits or vegetables, such as peaches, pears, apples, oranges, grapefruit, onions, potatoes, tomatoes and the like.

For the purpose of aiding in the feeding of successive articles 30 onto the metering assemblies 59a, 59b from the turntable 31 there are provided a first pair of front or upstream brushes 81a and 81b disposed on a common transversely extending, horizontally disposed shaft 82. For arresting the inertia of the articles 30 as they are fed from the metering assemblies 59a, 59b to the respective feed belts 80a, 80b there are provided, over the exit portion of assemblies 59a, 59b, a second pair of rear or downstream brushes 83a and 83b disposed on a common transversely extending, horizontally disposed shaft 84. The shaft 84 is parallel to the shaft 82. Upstanding brackets 85a and 85b support the journals 86a and 86b for the shaft 82, the shaft 82 being provided with a sprocket 87 outwardly of bearing 86b. In like fashion, upstanding brackets 88a and 88b support the bearings 89a and 89b respectively which journal the shaft 84. Furthermore, the shaft 84 is provided with a sprocket 94, outwardly of bearing 89b. The upstanding brackets 85a, 85b, 88a and 88b are supported from the sides of the frame 20, as illustrated in FIGS. 1A, 2 and 7.

Figure 7:
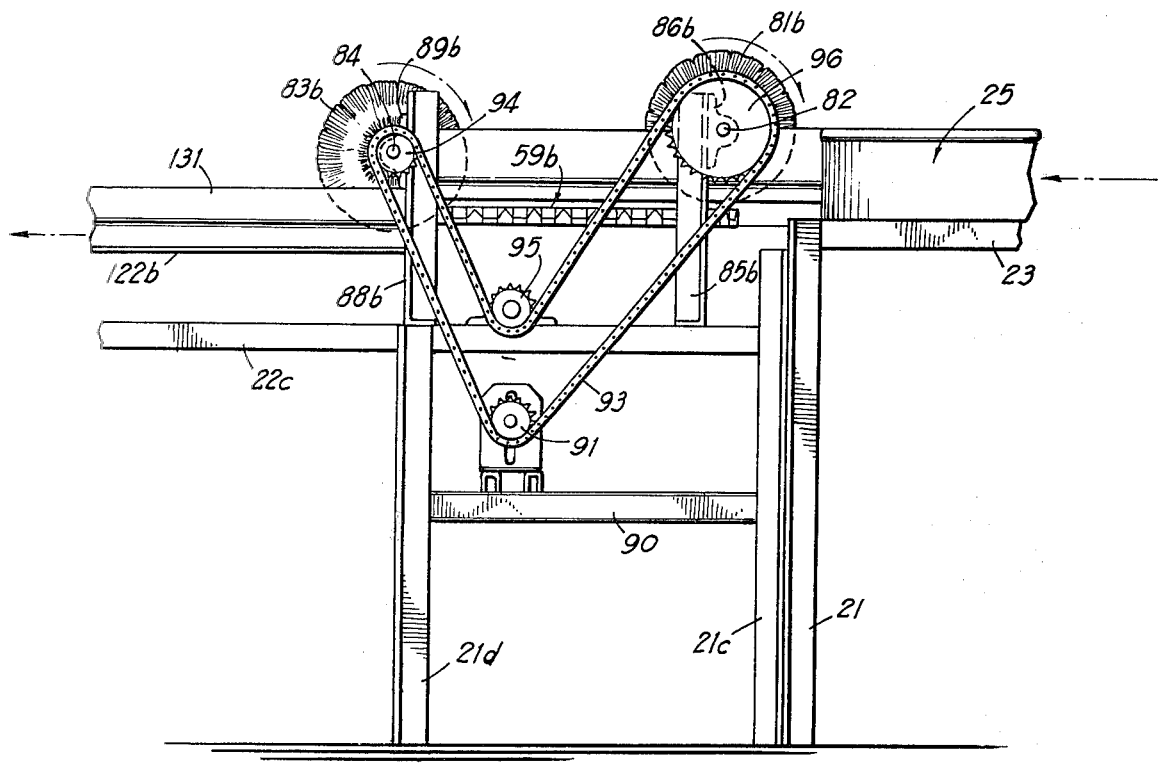
FIG. 7 is a vertical sectional view taken substantially along line 7—7 in FIG. 1A.

A motor M2 which is supported on an intermediate frame including longitudinal struts 90 carried by legs 21c and 21d is provided at one end with a drive sprocket 91 seen in FIG. 7 and at its other end with a pair of drive sprockets, denoted generally by numeral 92 in FIG. 2. The sprocket 91 draws a continuous chain 93 which extends over a sprocket 94 on shaft 84 and then under an idler sprocket 95 and over a sprocket 96 on shaft 82. The sprocket 94 is substantially smaller than the sprocket 96 so that the brushes 81a and 81b are rotated at a relatively high speed with respect to the brushes 83a and 83b. Thus, the brushes 81a and 81b tend to urge the articles 30 into the pockets which are formed progressively by the converging fingers 61a, 61b adjacent the discharge ends of the paths produced by the rakes 44 and 45. It will be observed that the flanges 33a, 33b, 34a and 34b are inclined inwardly and downwardly toward their respective metering assemblies 59a and 59b and have their lower edges terminate above the inner flights of fingers 61a, 61b. The leading edge of flanges 33a, 33b, 34a and 34b are flared so as to provide guidance for the articles 30 as they pass beneath rotary brushes 88a, 88b and onto the two metering assemblies 59a, 59b. In so doing, these relatively high speed brushes 81a, 81b tend to sweep the articles 30 into place and yet preclude the loading of more than one article 30 into a single pocket.

As the articles 30 are released successively from assemblies 59a, 59b, the relatively low-speed brushes 83a, 83b which operate at peripheral speeds faster than the linear speed of the assemblies 59a, 59b and at approximately equal to the linear speeds of the belts 80a, 80b, tend to arrest the movement of the articles 30 so that they remain stationary on the belts 80a and 80b. The linear speed of the metering assemblies 59a, 59b is less than the linear speed of the belts 80a, 80b, and therefore, the articles 30 will be spaced apart to a greater extend, on the belts 80a, 80b, than on the metering assemblies 59a, 59b. This is depicted for metering assembly 59a and belt 50a in FIG. 3. The operation of the metering assemblies 59a, 59b is such that the articles 30 are approximately equally spaced on the belts 80a and 80b.

The metering assemblies 59a, 59b are disposed in a plane slightly below the plane of the turntable 31 and overlap the belts 80a, 80b, the upper flights of the belts 80a, 80b being disposed in a common horizontal plane only slightly below the horizontal plane of the metering assemblies 59a, 59b. Thus, the articles 30 are dropped down an incline beneath the brushes 81a, 81b as they enter the metering assemblies 59a, 59b and are gradually progressively released by ends of these assemblies 59a, 59b onto the belts 80a, 80b while being held by the diverging fingers 61a, 61b and the brushes 83a, 83b as they are gently lowered onto belts 80a, 80b. Therefore, during the transition from each plane, the articles are under the control of the brushes 81a, 81b, 83a and 83b so that there is little chance of the articles being displaced on either the metering assemblies or the belts 80a, 80b.

For carrying the belts 80a, 80b there are provided beneath the metering assemblies 59a, 59b a pair of laterally spaced wheels, such as wheel 100 in FIG. 2, which are carried by a common transverse shaft 106 provided, outwardly of wheel 100, with a sprocket 101. The sprocket 101 is driven by a continuous chain 102 from the double sprocket 92. A chain 103, leading from sprocket 92 to sprocket 73, provides synchronous drive for the sprocket 73, thereby assuring that the metering assemblies 59a, 59b and the belts 80a, 80b are driven in synchronization from motor M2. Current from cables 104 controls the energization and de-energization of the motor M2 from an electrical control cubical or panel 105, seen in FIGS. 1A and 2.

At the end of the shaft 106 is a sensor 107, the function of which is to measure the speed of rotation of the shaft 106 and feed this information to the panel 105. Sensor 107 is preferably an optical encoder having a resolution of 3° and a TTL compatible output. The function of the encoder 107 is to provide timing pulses, each pulse indicating that the belts 80a, 80b have travelled approximately ¼ inch (0.2246").

The output of the sensor or encoder 107 is fed through on RS232 drives (1488) denoted by numeral 109, and, thence, via line 112 to the computer 120. The function of the driver 109 is to shape and enhance each pulse to provide a higher noise level immunity.

A pressure roller 108 is disposed outwardly adjacent to and cooperating with the wheel 100. The function of wheel 108 is to provide a drag on belt 80a so that it does not buckle or vary in tautness along its upper flight. The belt 80a has a roller (not shown) similar to roller 108. This pressure roller 108 is carried on a shaft 109 mounted on a lever 110 and resiliently urged against belt 80a on wheel 100 by a spring 111.

At the downstream end of the machine, the belts 80a, 80b pass around transversely spaced idler belt wheels, such as wheel 115, disposed on a common shaft 116, the shaft being journalled in bearings 117 supported on the down stream end of frame 20. A collection trough 118 is carried by the frame 20 and is disposed to receive all articles 30 which are not discharged laterally off of the belts 80a, 80a. A conveyor (not shown) returns these articles 30 from trough 118 to chute 27.

Figure 8:
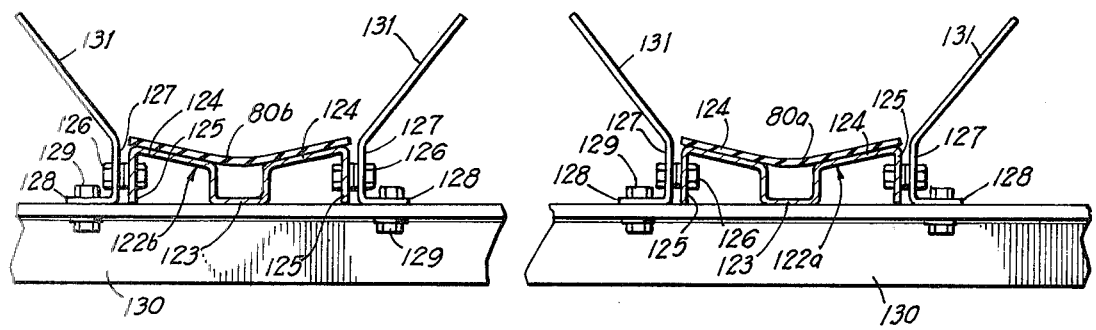
FIG. 8 is a vertical sectional view taken substantially along line 8—8 in FIG. 1A.

As best seen in FIGS. 1A, 3 and 8, after the upper flights of belts 80a and 80b leave the wheels, such as wheel 100, they slide along the upper surface of a pair of identical longitudinally parallel transversely spaced slide members 122a and 122b. The functions of these slide members are to impart an upwardly transverse concaved shape to the belts 80a and 80b throughout substantially their entire travel toward the downstream end of the machine and hold the belts in a longitudinally horizontal plane. This tends to center the articles 30 along the central portion of the belts 80a and 80b. Each slide member 122a or 122b includes a U-shaped or channel-shaped upwardly open central portion 123, the upper edges of which merge with the inner edges of opposed outwardly and upwardly diverging slide plates 124. The outer edges of these slide plates 124 are bent downwardly to provide parallel opposed spaced, vertically disposed flanges 125. As seen in FIG. 8, bolts 126 secure the flanges 125 to vertical plates 127, the lower ends of which are bent outwardly to provide their mounting flanges 128 which, in turn, are bolted by bolts 129 to crossbeams 130 appropriately spaced longitudinally along the frame 20. The upper edges of the mounting plates 127 terminate in upwardly and outwardly inclined guide plates 131 which are on opposite sides of and cooperate with the upper flights of belts 80a and 80b from inadvertently being discharged laterally over the edges of the belts 80a and 80b. Thus, the guide plates 131 stand above the belts 80a, 80b and converge toward and terminate closely adjacent the edges of belts 80a and 80b.

Figure 9:
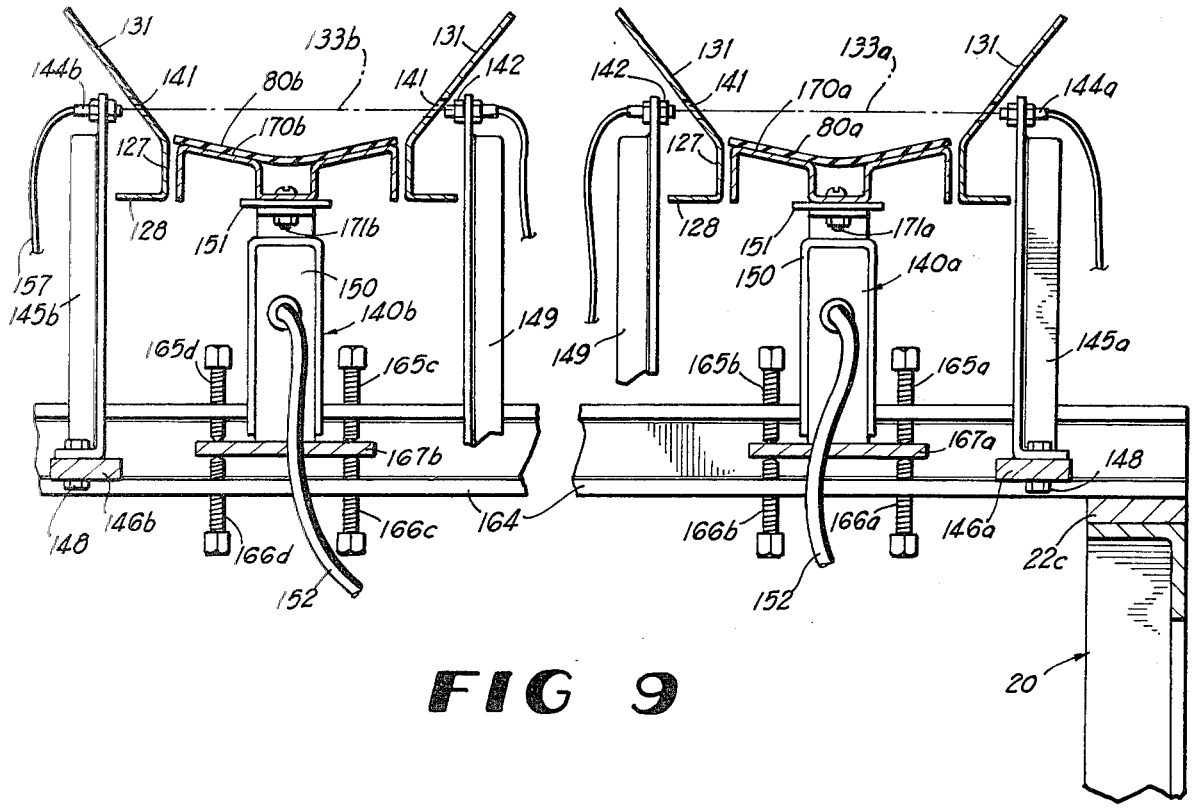
FIG. 9 is a vertical sectional view taken substantially along line 9—9 in FIG. 1A.

As shown in FIGS. 1A and 9, a central portion of the slide members 122a and 122b are cut away so as to provide transversely aligned rectangular openings for weighing cells, denoted generally by the numerals 140a and 140b. Furthermore, the guide plates 131 are provided with transversely aligned openings 141 which also are transversely aligned with the weighing station openings of the slide members 122a and 122b. Light sources of cells 142 are mounted on the central portion of frame 20 to shine outwardly respectively through the openings 41 across the paths of travel of the articles 30 on the belts 80a and 80b to produce transverse light beams 133a and 133b so that each article 30 will interrupt one of the light beams 143a or 143b as it is moved through its associated beam. Separate photo electric sensors, or electric eyes, 144a and 144b, are provided adjacent the openings 141 of the outer guide plates 131, the photoelectric sensors 144a and 144b being supported on upstanding arms 145a and 145b. The arms 145a and 145b are carried respectively by longitudinally extending bars 146a and 146b by means of bolts 148 in elongated slots which permit slidable adjustment of the position of the arms 145a, 145b, longitudinally. The light sources 142 are also respectively mounted on upstanding arms 149 which are adjustable in longitudinal directions. The signals from the bodies 150 of the weighing cells 140a and 140b are fed to the computer 120 via lines, such as wires 157, each weighing cell 140a and 140b includes a cell body 150 which provides an electrical analog output proportional to the weight on its platform 151. This analog signal is fed by a cable or conduit 152 to an amplifier and filter 153 which shapes the signal which is then fed to a control logic, such as an analog to digital converter 154.

The analog to digital converter 154 is connected to computer 120 through lines 160, 161, and 162. The functions of which will be described, hereinafter.

As seen in FIGS. 2 and 9, the longitudinally extending bars 146a and 146b are carried by the lower flanges of opposed channel members 164 and 165 which extend across the frame 20 and are supported by the longitudinally extending beams 22c. Inwardly of the beams 146a and 146b are opposed pairs of set screws 165a, 165b, 165c and 165d, which project through the upper flange of channel member 164. An opposing group of set screws 166a, 166b, 166c and 166d extend up through the lower flange of the channel member 164. The set screws 165a, 165b and 166a, 166b sandwich therebetween one end of a horizontally disposed weighing cells supporting plate 167a. Also the set screws 165c, 165d and 166c, 166d sandwich one end of a weighing cell supporting plate 167b. An opposing group of set screws, denoted by numeral 168 in FIG. 2, supports the forward end portions of the plates 167a and 167b in the same fashion as the set screws 165a, 165b, 165c, 166a, 166b, 166c, and 166d support their ends. Thus, the horizontally disposed weighing cells supporting plates 167a and 167b can be individually tilted and raised or lowered as desired so as to position a weighing tray 170a or 170b immediately below a portion of the belt 80a or belt 80b, as the case may be, which passes over the opening in the slide member 122a or 122b. The cross sectional contour of members 170a and 170b conform to the cross sectional contour of the slide members 122a and 122b. The member 170a is bolted to the weighing platform 151 of the weighing cell 140a by means of bolt 171a. In like fashion, the member 170b is bolted by means of bolt 171b to the platform 151 of the weighing cell 140b. Thus, when an article is transported by the belt 80a or 80b over the respective member 170a or 170b, the weight thereof will be detected by the weighing cell 140a or 140b, as the case may be.

Referring now to FIG. 1B, it will be seen that a plurality of gates are provided, respectively including parallel disposed, longitudinally spaced, laterally feeding discharge belts 200a, 200b, 200c, 200d, 200e immediately beneath the upper flight of belts 80a and 80b. These belts are continuously driven when the machine is in operation by means of a motor M3, provided with a sprocket 201 driving a continuous chain 202 which, in turn, drives a sprocket 203 fixed on the central portion of a longitudinally extending drive shaft 204 which extends beneath the upper flight of all the discharge belts 200a, 200b, 200c, 200d and 200e. This power supply shaft, in turn, is provided with a plurality of longitudinally spaced sprockets 205 which respectively drive through chains 206 the sprockets 207. The sprockets 207 are respectively provided on the ends of shafts 208 which respectively carry drums 209 around which the conveyor belts 200a, 200b, 200c, 200d and 200e pass. Idler drums 210 carry the other ends of belts 200a, 200b, 200c, 200d and 200e so as to support the upper flights of these belts in a common horizontal plane, immediately below the upper flights of belts 80a and 80b. Appropriate structure (not shown) supports the shafts 204 and 208 as well as the motor M3. The belts 200a, 200b, 200c, 200d and 200e feed in the direction of the arrow 212 so as to discharge articles fed thereto over the drums 209. Arranged below the belts 200a, 200b, 200c, 200e, are a like number of container positioning conveyors, such as conveyor 213, the function of which is to position containers for receiving the articles 30 which are discharged by the belt, such as belt 200b, into a prescribed container 214 and then to index itself to position a subsequent container 214 therebeneath. The operation of the container supporting conveyor 213 is controlled by the computer 120 as will be explained hereinafter. As best seen in FIG. 10, each of the discharge belts, such as belt 200a, is provided with a plurality of juxtaposed idler rollers 215 which support the upper flight of the belts, such as belt 200a.

Referring now to FIG. 1B, it is seen that the flanges 131 terminate in the vicinity of the upstream edge of belt 200a with the flanges 131 which are adjacent to the right side of the belts 80a and 80b being provided with deflector plates 220a and 220b which, in turn, are connected to the longitudinally extending vertically disposed nozzle supporting plates 221a and 221b as seen in FIG. 10, the nozzle supporting plates 221a and 221b have lower flanges 222a and 222b which are bolted to transversely extending struts such as strut 223 by means of bolts such as bolt 224. Furthermore, these upstanding plates 221a and 221b are bolted by means of bolts 225 to the flanges 125 of the slide members 122a and 122b respectively.

A plurality of longitudinally spaced fluid directing means such as air nozzle 230a, 230b, 230c and 230e are supported adjacent appropriate holes in the nozzle supporting plate 221, these nozzles being mounted on the plate 221 so as to direct fluid, i.e., air horizontally across the belt 80a, the air stream being denoted respectively by the arrows 231a, 231b, 231c and 231e.

In like fashion, the nozzle mounting plate 221b is provided with nozzles 230f, 230g, 230h and 230j which direct air streams denoted by the arrows 231f, 231g, 231h and 231j across the belt 80b.

The feeding of air to each of the nozzles 230a, 230b, 230c, 230e, 230f, 230g, 230h and 230j is controlled by individual rotary solenoid valves 233a, 233b, 233c, 233d, 233d, 233f, 233g and 233j, as seen in FIG. 1B. The conveyor 200d is also provided with nozzles (not shown) and solenoid valves such as solenoid valve 233d of FIG. 11.

Figure 11:
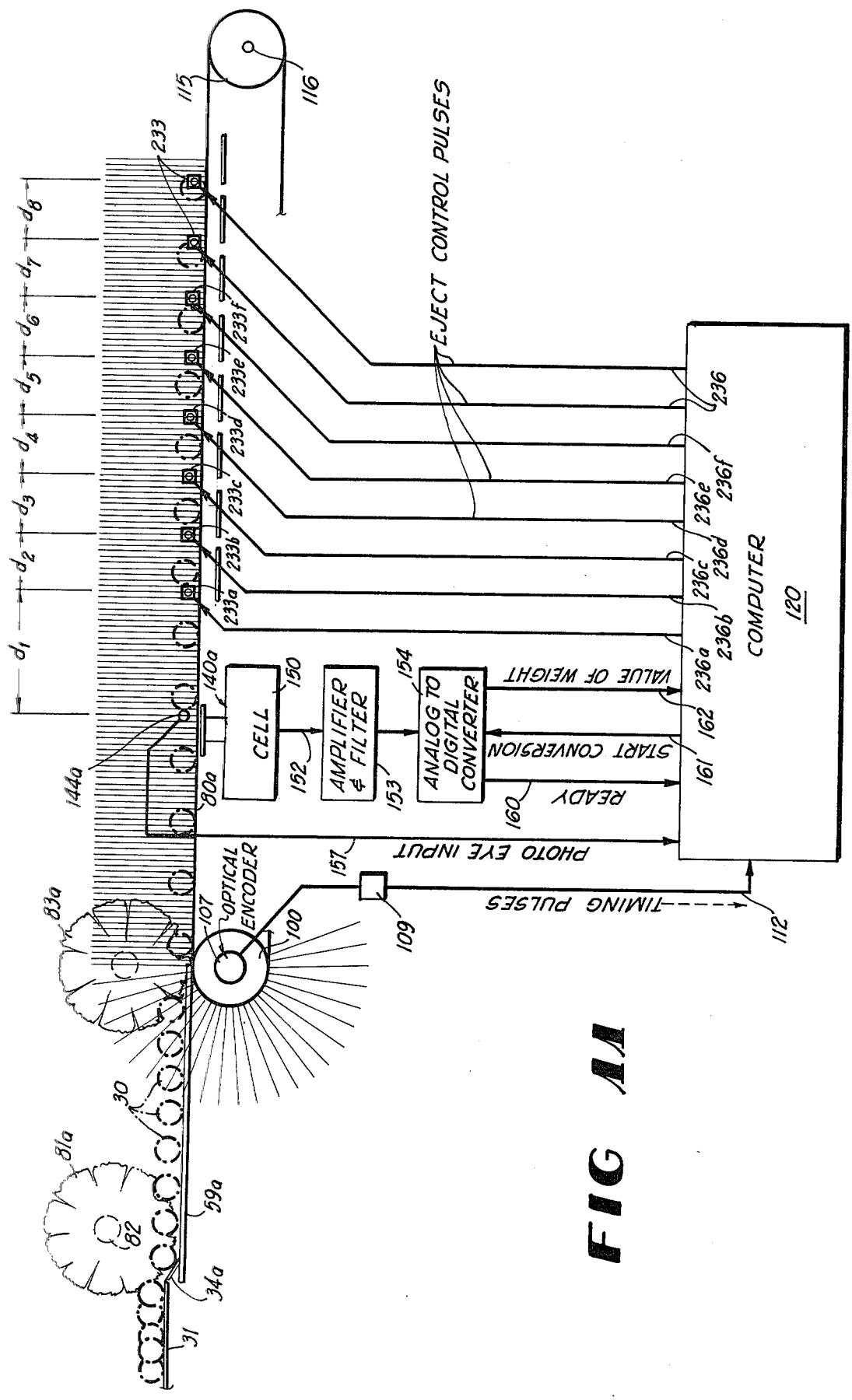
FIG. 11 is a schematic functional diagram depicting the article weighing machine of the present invention.

As seen in FIG. 1B, the nozzles 231a, 231b, 231c, 231e, 231f, 231g, 231h and 231j are mounted in pairs of transversely aligned nozzles disposed over the belts 200a, 200b, 200c, 200d so that, when air is directed transversely across the belt 80a and 80b by the respective nozzles, articles which are disposed in front of the nozzle will be impinged upon by the stream of air and deflected laterally to pass over the edge of the belt 80a or 80b and onto its appropriate discharge belt 200a, 200b, 200c or 200e, as the case may be. The solenoid valves 233a, 233b, 233c, 233d, 233e, 233f, 233g, 233h and 233j are respectively connected via hoses 235 to an air manifold 236, seen in FIG. 10. Furthermore the relays incorporated into each solenoid valve, such as solenoid valves 233a, 233b, 233c, 233d and 233e are respectively connected electrically to the computer 120 by lines or wires 236a, 236b, 236c and 236e so as to be electrically tripped or triggered by the computer 120 to rotate the valve. There may be additional lines of discharge nozzles (not shown) controlled by additional solenoid valves 233 downstream from the solenoid valve 233e, if desired. This is illustrated in FIG. 11. Of course, such additional solenoid valves would be provided with individual lines 236 leading to the computer 120.

Referring again to FIGS. 1B and 10, it will be seen that on a side of belt 80a and on a side of belt 80b opposite to each of the respective nozzles 230a through 230f, there are a like number of flexible skirts, denoted by the numerals 238a, 238b, 238c, 238d, 238e, 238f, 238g, 238h, 238i and 238j, which are respectively bolted to the flange 125 by bolts 239, as illustrated in FIG. 10. Each of the skirts, such as skirts 238a and 238f in FIG. 10 extend up along its vertical flange 225 and then curves outwardly and downwardly so that its lower end rides upon the upper flight of its associated discharge conveyor such as conveyor 200a. Each skirt is formed of a flexible elastomeric material so as to provide a discharge chute which will gently guide the articles onto the discharge belt such as belt 200a.

Spaced laterally from each skirt, such as skirt 238a, is a flexible baffle, such as the baffles 240a and 240f illustrated in FIG. 10. The baffles, such as baffle 240a, also extends downwardly, curving in the direction of travel of belt 200a so that its lower portion rides upon the surface of the upper flight of belt 200a. The function of the baffle 240a is to provide a backstop for the fruits and vegetables or articles 30 which are discharged laterally so as to assure that they are directed onto the upper flight of belt 200a. Lugs, such as lugs 241a and 241f, support the upper ends of the baffles, such as baffles 240a and 240f, these lugs being pivotally mounted on longitudinally extending rods 242 which are supported by individual brackets 243. The brackets 243, in turn, are supported by the transverse struts 223 which extend substantially the length of the discharge conveyors, such as conveyor 200a and are provided with downwardly extending side plates 244 on opposite sides of each conveyor, such as conveyor 200a.

It will be understood that when an article 30 is discharged laterally by a blast of air, it will, perhaps, strike one of the baffles, such as baffle 240a or 240f, as the case may be, and then will fall down upon the conveyor 200a and pass beneath this baffle and beneath any other skirt or baffle in its pathway. The upper ends of these flexible elastomeric baffles, such as baffle 240a or 240f, thus stand well above the horizontal plane of belts 80a, 80b and define with their associated skirts, such as skirts 238a and 238f a passageway for the articles from the conveyor or feed belts 80*a*, 80*b* to the discharge conveyors.

OPERATION

In the console 105 there are three thumb wheel switches (not shown) for each gate assembly, i.e., for each discharge conveyor, such as conveyor 200*a*, and its pair of nozzles 230*a* and 230*f*. The gate distance from the weighing cell is depicted in FIG. 11 as $d_1$, for the first gate d, $+d_2$ for the second gate and $d_1+d_2+d_3$ for the third, etc. Such distances are set into the random access memory (RAM) of the computer 120.

The other two thumb wheel switches set the physical characteristics, i.e., the high and low weights for establishing a class for articles 30 which will actuate the air nozzles of a particular gate. The loading of the read only memory is set into the machine, a typical program being attached hereto as Table I.

When the machine is started, the microprocessor of the computer 120 begins to read in the high and low settings for each gate and store this information on a circular list in the RAM. Next the main program sequence will start.

When the machine is turned "on" current is supplied to motors M1, M2 and M3 to operate them continuously. Thus, the turntable 31 is rotated continuously, the two metering assemblies 59*a* and 59*b* and the belts 80*a* and 80*b* are thus driven continuously.

When the articles 30 are fed down chute 27 onto turntable 31 they are carried by the turntable in the paths of arrows 42 and 43 and then one at a time into the progressively advancing cups formed by fingers 61*a* and 61*b*. Because the cup will hold only one article 30, if there is an accumulation of articles 30 they usually will not enter the metering assemblies 59*a*, 59*b*. If such articles are on these assemblies, they will be directed by the inclined flanges 33*a*, 33*b*, 34*a*, 34*b* into the first vacant cup.

The articles 30 are deposited progressively, in successive pairs, by the assemblies 59*a*, 50*b* and the brushes 83*a*, 83*b* onto belts 80*a*, 80*b* in non-spinning equally spaced condition where they are transported over the detecting means, i.e., weighing cells 140*a*, 140*b*. As an article 30 enters the weighing cell zone it breaks the light beam 133*a* or 133*b* thereby actuating the photo sensor 144*a* or 144*b* to signal this presence to computer 120 which begins the weighing operation and the counting operation. In these operations, the computer 120 operates much as a shift register. The signal from the sensor 144*a* or 144*b* triggers the computer 120 which, in turn, signals the analog to digital converter 154 to start conversion and, then reads the eight bit digital numbers which is derived by the converter 154 from the analog value representing weight on cell 140*a*, or 140*b*. This digital number is returned to the computer 120. The resolution is to 1/10 ounce.

The computer 120 then compares the digital value with that value stored in the random access memory (RAM) to determine in which particular class the article 30 belongs. During its path across the cell 140*a* this weight is taken some eight times and an average is computed by the computer and stored in a prescribed location for that class in the memory of the machine.

The pulses from the optical encoder 107 are fed to the computer as clock pulses and index the computer 120 one number so that a prescribed number of pulses, after the sensor 144*a* or 144*b* is triggered, indicates that the selected article 30 has travelled distance $d_1$, or distance $d_1+d_2$, etc. along its path. When the count reaches that location for the prescribed class of articles 30, a signal via one of lines 236*a*, 236*b*, 236*c*, 236*d*, 236*e*, etc., momentarily actuates its associated solenoid 233*a*, 233*b*, 233*c*, 233*d*, or 233*e*, etc. Thus, the associated nozzle releases a short blast of air transversely across the belt 80*a* or 80*b* as the selected article 30 has reached distance d, or $d_1+d_2$ or $d_1+d_2+d_3$, etc. as the case may be.

The computer 120 schedules the articles on the belts 80*a*, 80*b* and its prescribed distance of travel so that each article 30 is directed laterally by a blast of air from a selected nozzle, according to its weight class. It is preferable that the heaviest articles 30 be discharged from the first gate by nozzles 230*a* and 320*f*, and that the progressively lighter articles be ejected by successive pairs of nozzles 230*b* and 230*g*, etc.

ELECTRONICS

Figure 12:
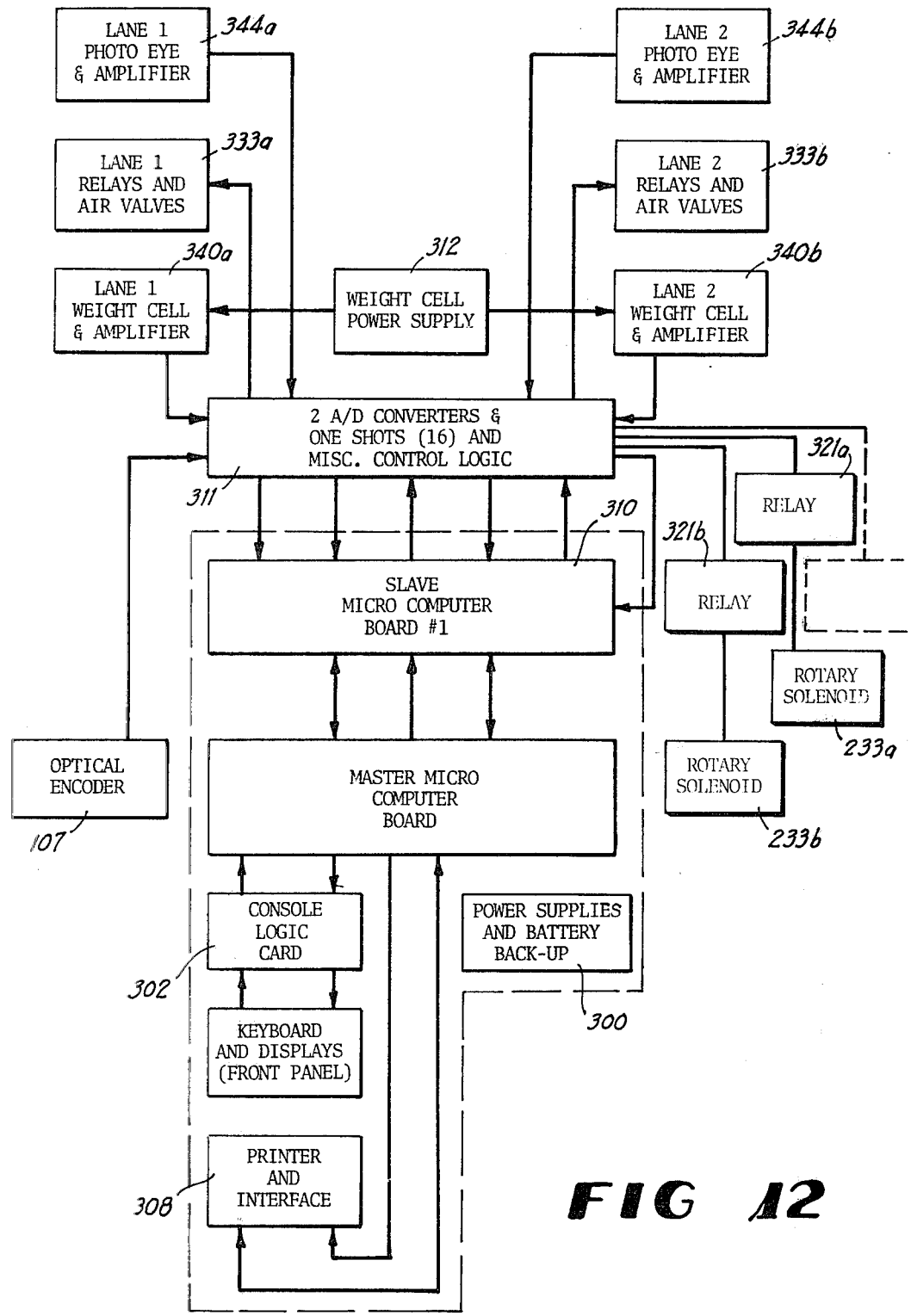
FIG. 12 is a logic diagram further depicting the operation of the machine of the present invention.

A typical arrangement of the electronics of the present invention for a particular embodiment is depicted in FIG. 12 such electronics are made up of two basic selections:

1. Console Electronics of console 105; and
2. Lane electronics of lanes 1 and 2.

The console electronics allows the user to enter the data and "Arrange" the machine into the configuration desired. It also allows the monitoring of how much fruit has been processed. The lane electronics includes the weight cells 140*a*, 140*b* and the logic to keep track of each article 30 and eject article 30 at the proper time.

I. Console Logic Comprises:
   1. Optical Encoder 107
   2. Power Supplies and Battery, denoted by numeral 300
   3. Master Microcomputer Board 301
   4. Console Logic Card or Board 302
   5. Front Panel 320
     a. Keypad 304
     b. Displays 305
     c. LEDs 306
     d. Switch 307
   6. Printer, Interfacer and Printer Power Supply 308

II. The Lane Electronics Comprises:
   1. Slave Microcomputer 310
   2. A/D and One Shot Board 311
   3. Weight Cell Power Supply 312
   4. Weight Cells and Amplifiers 340*a* and 340*b*
   5. Relays and Air Valves 333*a* and 333*b*
   6. Photo Eye and Amplifier 344*a* and 344*b*

The operation of the machine includes:
1. Set Up
2. Run; and
3. Inventory

CONSOLE LOGIC

Each Module includes:

1. The Optical Encoder 107 which is a shaft encoder which has a resolution of 3 degrees. The encoder has TTL compatible output. This output is put into a RS232 driver (1488) 109 to give the signal a higher noise immunity. This one signal is used to break the distance on the belt 80*a*, 80*b* into timing pulses for the microcomputers. Each pulse is approximately $\frac{1}{4}''$ (0.2246") of distance on the belt 80*a*, 80*b*.

2. The Power Supplies and Battery 300 supplies current to drive the whole system and includes:
   (1) +5 V;

(2) −5 V;
(3) −15 V;
(4) −15 V;
(5) +12 V;
(6) −12 V.

The +5 supply is for the logic circuits. The −5 and +12 are for the 2708 EROM. The +12 and −12 for the RS232 drivers 109. The +15 and −15 is for the analog to digital converters 311.

There is also a battery which will keep the data stored in the Ram Memory from being lost for approximately 2 hours when power is lost.

3. The Master Microcomputer Board 301 is the main controlling module. Its main task is to read the front panel 320, interpret the keys and set-up each of the slave microcomputers, such as board 310 in the correct configuration. It also sees that the correct data is displayed by the LED 306 and controls the printer 308 when it is needed. It gathers data from each of the slave microcomputers 320 and formats and totals the data for the inventory report to be printed by printer 308.

The master microcomputer board 301 is the same board as the slave microcomputer boards 320 as far as the hardware is concerned, only the driving software and its "outside world" connections are different.

4. Console Logic Board or card 302 contains the receiver (1489) for the optical encoder 311. Its signal is converted back to TTL Signal and fed back to the slave microcomputers 310.

The second part of this board 302 contains the dip switches that are used to tell the microcomputer how many pulses $d_1$, $d_2$, $d_3$, $d_4$, $d_5$, $d_5$, $d_7$, and $d_8$ away the next ejection gate is from the last one. There are two different sets of switches: A base and a lane distance switch. The base switch is used for gates that are very far apart. This base number is added to each of the lane switches. The lane switches are used to enter a binary number which represents the number of pulses from the last gate (or in the case of size one, the last gate would be photo eye 344a and 344b)

A third part of this board 302 contains a Cmos Memory (128×8) and battery for retaining the high and low settings when the power is turned off.

5. Front Panel 320 contains a keypad 304 for entering data. This allows the user to set up the machine in any configuration that he needs. He can also use the keypad 304 to determine which lane the reading is from. He can also use the keypad 304 to display all of one lane's high and low setting of one size in all of the lanes. Two LEDs 306 and a display are used to tell the user what the displays represent. The size LED is on when the user is looking at one size on all lanes. The lane LED is on when he is looking at the different sizes on one lane. The display tells him which lane he is looking at.

Another part of the panel 320 is the keyswitch 307 with four positions:
(a) "Use Key"—In this position the keys can be used and data can be entered.
(b) "Lock Keys"—In this position the machine will not respond to any of the keys 304. The front panel is locked.
(c) "Test"—This is used for servicing and initial set-up of the machine.
(d) "Master Clear"—This clears everything in each of the microcomputers except the high and low settings. It also reinitializes each of the microcomputers 310 and 301.

The final part of the front panel is the printer 308 and the printer button 319. When this is pushed the printer 308 responds by printing out all of the weight and totals that have passed through the machine since the last "Master Clear".

6. Printer, Interface and Power Supply —This is a self contained unit which is bought tested and assembled from Practical Automation, Inc.

LANE ELECTRONICS

The Lane Electronics include the following parts:

1. Slave Microcomputer 310 - This module 310 is normally used to control up to two lanes with eight different sizes on each lane. The main function of this module is:
   (1) take signal from photo eye 344a or 344b which indicates an article 30 is ready to be weighed.
   (2) Take eight different weights and average them to get an accurate weight.
   (3) Put them into the weight table according to size.
   (4) Keep track of them until time for ejection.
   (5) Fire relays 321a, 321b etc. to actuate the rotary solenoids 233a, 233b, etc. to permit air to be released by the associated nozzle 230a, 230b etc.
   (6) Keep track of the total weight of each class for the inventory.

Should the different size gates be more than 40 inches apart, it is best to use one slave microcomputer 310 for each lane.

2. The A/D and One Shot Logic or Board 311 - This board 311 contains two analog to digital converts, the photo eye logic, and the "one shot" logic. The A/D gets its start signal from its slave microcomputer 310. When it has finished its conversion cycle, it outputs a signal to the microcomputer 310 to tell it that the data on its data lines are valid data from the last conversion.

The photo eye logic takes a signal from the photo eye 344a or 344b and sends it to the microcomputer 310 to tell it that some article 30 is ready to be sized i.e., weighed.

The "one shot" logic is used to signal the relays 321a or 321b, etc. that the article 30 is ready to be ejected. The master microcomputer 301 sends a number (0-15) to the board 310. This is decoded into different gates (0 is Lane 1, gate 1; 1 is Lane 1, gate 2 . . . ; 15 is Lane 2, gate 8). This decoded signal is used to fire the corresponding one shot which sends out a pulse to the relay 321a or 321b, etc. This pulse length is controlled by the resister and capacitor on the one shot. This board 311 is normally used with each slave microcomputer 311. If a slave microcomputer 311 is controlling only one lane, approximately one half of the components can be removed.

3. The Weight Cell Power Supply —This is a self contained unit which is used to power up to two weight cells 340a, 340b and their amplifiers.

4. Weight Cell and Amplifier 340a or 340b —This unit is used to a weight for each article 30. Basically each article 30 pushes down the transducer of the weight cell a certain distance. This distance is measured by its analog output in the form of a voltage (0–10 V). This analog signal is fed to the analog to digital converter 311 which outputs a number that the microcomputer 310 can use.

5. Relays and Air Valves - The Lane 1 relay and air valves 333a (or lane 2 relays and valves 333b) as broken down for illustration in FIG. 12, include a series of relays, such as relays 321a, 321b, etc., which respectively control individual rotary solenoids 233a, 233b, etc.

6. Photo Eye and Amplifier - The photo eye module 344a or 344b is used to tell the microcomputer 310 when an article 30 is ready to be weighed.

TABLE I

```
ISIS 8080 MACRO ASSEMBLER, V1.1
ELECTRONIC SIZER  MICRO CONTROLER    VER 1.0

TITLE   'ELECTRONIC SIZER   MICRO CONTROLER    VER 1.0
                    ;
                    ;   EQUATE SECTION.
                    ;
        0000            PORTA   EQU     00
        0001            PORTB   EQU     01
        0000            PORTC   EQU     00
        0001            PORTD   EQU     01
        0002            PORTE   EQU     02
        0007            MSK1    EQU     00000111B
        007F            ENB1    EQU     01111111B
        0008            OFSET   EQU     08
        0064            OFST1   EQU     100
        0008            NRDY    EQU     00001000B
        0007            RDY     EQU     00000111B
        008F            ENBH    EQU     10001111B
        004F            ENBL    EQU     01001111B
        002F            ENBD    EQU     00101111B
        0017            ENBLAD  EQU     00010111B
        0008            MSK3    EQU     000010000B
        0020            MSK2    EQU     00100000B
        0010            MSK4    EQU     000010000B
        0040            CVMSK   EQU     01000000B
        0008            MSK5    EQU     000001000B
        00FE            GOAD    EQU     11111110B
                    ;
                    ;   DATA SECTION
                    ;
        1000            ORG 1000H           ; START OF RAM.
        1000            BIN1    EQU     1000H
        1023            NUMBIN  EQU     BIN1+35
        1024            HIGH    EQU     NUMBIN+1
        102C            LOW     EQU     HIGH+8
        1034            CNTH    EQU     LOW+8
        103C            CNTL    EQU     CNTH+8
        1044            BINH    EQU     CNTL+8
        104C            BINL    EQU     BINH+8
        1054            COUNT   EQU     BINL+8
        1055            CONVRT  EQU     COUNT+1
        1056            WTBLE   EQU     CONVRT+1
        0010            WTBLH   EQU     10H
        0056            WTBLL   EQU     56H

1064            ORG 1064H
        1064            BIN2    EQU     1064H
        10C8            BIN3    EQU     BIN2+100    ; 26
        112C            BIN4    EQU     BIN3+100    ; 38
        1190            BIN5    EQU     BIN4+100    ; 50
        11F4            BIN6    EQU     BIN5+100    ; 62
        1258            BIN7    EQU     BIN6+100    ; 74
        12BC            BIN8    EQU     BIN7+100    ; 86
        1320            BIN9    EQU     BIN8+100
                    ;
                    ;   THIS IS THE INITIALIZATION PROGRAM.
        0000            ORG     0000H
        0000 3E08       MVI     A,NRDY      ;
        0002 D301       OUT     PORTD
        0004 DB00       IN PORTA            ; CK TO SEE IF RESET OR LOOK.
        0006 E610       ANI MSK4
        0008 CA0003     JZ RESET
                    ;
                    ;
```

```
000B F3              DI
000C 0E08    LOP1:   MVI    C, 8        ; THIS ROUTINE DISPLAYS
000E 215710          LXI    H, WTBLE+1  ;   THE 8 MEMORY LOCATIONS
0011 7E      LOP2:   MOV    A, M        ;   THAT WERE USED AS THE
0012 2F              CMA                ;   BASIS FOR THE LAST WT.
0013 D302            OUT    PORTE
0015 CD2000          CALL   HOLD 0018 23              INX    H
0019 0D              DCR    C
001A C21100          JNZ    LOP2
001D C30C00          JMP    LOP1

0020 0608    HOLD:   MVI    B, 8
0022 110000  HLD1:   LXI    D, 00
0025 1C      HLD2:   INR    E
0026 C22500          JNZ    HLD2
0029 14              INR    D
002A C22500          JNZ    HLD2
002D 05              DCR    B
002E C22200          JNZ    HLD1
0031 C9              RET

0300                 ORG    0300H

RESET:
0300 F3              DI                 ; DON'T ALLOW INTERRUPTS
                                        ;   UNTIL RESET IS COMPLETE.
0301 AF              XRA    A           ; ZERO A.
0302 2F              CMA                ; PUT ALL ONES IN A.
0303 D300            OUT    PORTC       ; CLEAR  PORTS.
0305 D302            OUT    PORTE       ;
0307 110004          LXI    D, 1024     ; LOAD CNTER WITH # OF BYTES.
030A 210010          LXI    H, 1000H    ; STARTING ADDR OF RAM.
030D AF              XRA    A           ; ZERO A.
             RST1:
030E 77              MOV    M, A        ; ZERO ALL RAM.
030F 23              INX    H           ; NEXT LOCATION.
0310 1B              DCX    D           ; DCRMNT COUNTER.
0311 BB              CMP    E           ; IS E ZERO?
0312 C20E03          JNZ    RST1        ; LOOP UNTIL FINISHED.
0315 BA              CMP    D           ; E WAS ZERO, IS D?
0316 C20E03          JNZ    RST1        ; LOOP UNTIL DE IS ZERO.

0319 21FF13          LXI    H, 13FFH    ; INITALIZE STACK.
031C F9              SPHL               ;   WITH BOTTOM ADDR OF RAM.

031D DB00            IN     PORTA       ; READ IN # OF BINS.
031F 2F              CMA                ; CORRECT INVERTED DATA.
0320 E607            ANI    MSK1        ; STRIP OF NUMBIN DATA.
0322 322310          STA    NUMBIN      ; STORE # OF BINS.

0325 47              MOV    B, A        ; LOAD B & C WITH NUMBIN.
0326 4F              MOV    C, A
0327 3E7F            MVI    A, ENB1
0329 210010          LXI    H, BIN1
032C 116400          LXI    D, OFST1    ; LOAD DE WITH OFFSET BETWEEN BINS.
             RST2:                      ; LOAD ALL ENABLE #'S
032F 77              MOV    M, A        ;   INTO PROPER BINS.
0330 19              DAD    D
0331 0F              RRC                ; MAKE NEW ENBL.
0332 05              DCR    B           ; KEEP TRACK OF BINS.
0333 C22F03          JNZ    RST2        ; LOOP NUMBIN TIMES.

0336 C34403          JMP    RST3

S1RST:                     ; SUBROUTINE TO INCR HL &
                                        ;   GET NEW BIN ADDR.
0339 E5              PUSH   H           ; STORE HL.
033A EB              XCHG               ; PUT DE INTO HL.
033B 1600            MVI    D, 0        ; ZERO D AND PUT
```

```
0233D 5F              MOV E,A         ;    OFSET INTO E
0233E 19              DAD D           ; CALCULATE NEW BIN ADDR.
023F EB               XCHG            ; PUT NEW ADDR INTO DE.
0340 E1               POP H           ; RECOVER HL.
0341 23               INX H           ; GO TO NEXT LOCATION IN TBL.
0342 0D               DCR C           ; ONE LESS BIN.
0343 C9               RET             ; GO BACK.
                ;
                RST3:                 ; INIT BINH TBL.
0344 41               MOV B,C         ; SAVE # OF BINS.
0345 3E64             MVI A,OFST1     ; A GETS OFFSET.
0347 214410           LXI H,BINH      ; LOAD HL WITH ADDR BINH.
034A 110110           LXI D,BIN1+1    ; LOAD DE WITH BIN ADDR.
                RST3A:
034D 72               MOV M,D         ; STORE NEW BINH ADDR.
034E CD3903           CALL S1RST      ; INCR HL & GET NEW BIN ADDR.
0351 C24D03           JNZ RST3A       ; LOOP NUMBIN TIMES.
                RST4:                 ; INIT BINL TBL.
0354 110110           LXI D,BIN1+1    ; GET 1ST ADDR.
0357 48               MOV C,B         ; RECOVER NUMBIN INTO C.
0358 214C10           LXI H,BINL      ; SET PTR TO LOW BIN.
                RST4A:
035B 73               MOV M,E         ; STORE NEW BINL ADDR.
035C CD3903           CALL S1RST      ; INCR HL & GET NEW BINL ADDR.
035F C25B03           JNZ RST4A       ; LOOP NUMBIN TIMES.
                ;
                RST5:
0362 C38303           JMP RST6        ; JUMP AROUND SUBROUTINE.
                ;
                LOAD:                 ; SUBROUTINE TO BRING IN DATA,
                                      ;   CONVRT TO BINARY, AND STORE
                                      ;   IT IN HIGH/LOW TBL.
0365 D301             OUT PORTD       ; ENABLE DATA PORT.
0367 E5               PUSH H          ; SAVE TBL POINTER.
0368 210004           LXI H,BCDTBL    ; LOAD ADDR OF BCD-BIN TBL.
036B DB01             IN PORTB        ; READ IN DATA.
036D 2F               CMA
036E 6F               MOV L,A         ; L GETS # TO CONVRT.
036F 66               MOV H,M         ; READ BINARY #.
0370 DB00             IN PORTA        ; SEE IF BIT 9 EQ 0.
0372 E620             ANI 00100000B
0374 FE20             CPI 00100000B
0376 7C               MOV A,H         ; BIT 9 0, ADD 10.
0377 CA7C03           JZ LOAD1
037A C664             ADI 100
037C E1       LOAD1:  POP H           ; RESTORE HIGH/LOW TBL PTR.
037D 77               MOV M,A         ; STORE NEW DATA INTO TBL.
037E 23               INX H           ; INCR POINTER TO NEXT LOCATION.
037F 15               DCR D           ; INCR DATA ENBL PTR AND
0380 7A               MOV A,D         ;    STORE IT IN A.
0381 0D               DCR C           ; IS THAT ALL?
0382 C9               RET             ; RETURN AND FIND OUT.
                ;
                RST6:                 ; PUT HIGH DATA INTO TBL.
0383 3E8F             MVI A,ENBH      ; INITALIZE ENBL PTR.
0385 57               MOV D,A         ; STORE PTR.
0386 48               MOV C,B         ; SAVE NUMBIN.
0387 212410           LXI H,HIGH      ; POINT TO HIGH TBL.
                RST6A:
038A CD6503           CALL LOAD       ; LOAD LOW TBL.
038D C28A03           JNZ RST6A       ; LOOP NUMBIN TIMES.
                RST7:                 ; PUT LOW DATA INTO TBL.
0390 3E4F             MVI A,ENBL      ; INIT ENPL POINTER.
0392 57               MOV D,A         ; STORE PTR.
0393 48               MOV C,B         ; STORE NUMBIN.
0394 212C10           LXI H,LOW       ; POINT TO LOW TBL.
                RST7A:
0397 CD6503           CALL LOAD       ; LOAD LOW TBL.
039A C29703           JNZ RST7A       ; LOOP NUMBIN TIMES.
                RST8:                 ; BRING IN DIST. DATA.
039D 3E2F             MVI A,ENBD      ; INIT ENBD PTR.
039F 57               MOV D,A         ; STORE PTR.
03A0 48               MOV C,B         ; STORE NUMBIN.
```

```
03A1 213C10            LXI   H,CNTL    ; LOAD ADDR OF CNT LOW TBL.
               RST8A:
03A4 D301              OUT   PORTD     ; ENABLE DATA PORT.
03A6 E5                PUSH  H         ; SAVE TBL POINTER.
03A7 210002            LXI   H,DISTBL  ; LOAD ADDR OF DIST TBL.
03AA DB01              IN    PORTB     ; READ & STORE DATA.
03AC 2F                CMA
03AD 6F                MOV   L,A       ; L GETS # TO CONVRT.
03AE 7E                MOV   A,M       ; A GETS CONVRTED #.
03AF E1                POP   H         ; RESTORE DIST TBL PTR.
03B0 77                MOV   M,A       ; STORE NEW DATA INTO TBL.
03B1 23                INX   H         ; INCR PTR TO NEXT LOCATION.
03B2 15                DCR   D         ; INCR DATA ENLB PTR AND
03B3 7A                MOV   A,D       ;   STORE IT IN A.
03B4 0D                DCR   C         ; IS THAT ALL.
03B5 C2A403            JNZ   RST8A     ; LOOP NUMBIN TIMES.
               RST9:                   ; CONVRT DIST TO COUNT.
03B8 78                MOV   A,B       ; A GETS NUMBIN.
03B9 213C10            LXI   H,CNTL    ; HL GETS CNTL ADDR.
03BC 113410            LXI   D,CNTH    ; DE GETS CNTH ADDR.
03BF 010000            LXI   B,0       ; ZERO B & C.
               RST9A:                  ; CONVRT TO TOTAL COUNT.
03C2 E5                PUSH  H         ; STORE BINL ADDR.
03C3 6E                MOV   L,M       ; LOAD L WITH DIST.
03C4 2600              MVI   H,0       ; ZERO H.
03C6 09                DAD   B         ; ADD CNT TO TOTAL CNT.
03C7 44                MOV   B,H       ; MOVE NEW CNT TO BC.
03C8 4D                MOV   C,L
03C9 E1                POP   H
03CA 71                MOV   M,C       ; STORE BINL CNT.
03CB EB                XCHG            ; GET BINH ADDR.
03CC 70                MOV   M,B       ; STORE BINH CNT.
03CD EB                XCHG            ; RESTORE BINL ADDR TO HL.
03CE 23                INX   H         ; GO TO NEXT LEVEL.
03CF 13                INX   D
03D0 3D                DCR   A         ; ONE LESS TO GO.
03D1 C2C203            JNZ   RST9A     ; LOOP NUMBIN TIMES.
               RST10:
03D4 3E07              MVI   A,7       ; TURN RDY LIGHT ON.
03D6 D301              OUT   PORTD     ; ALLOW PULSE TO ENTER.
03D8 FB                EI
               WCONVT:                 ; WAIT FOR CONVRT COMMAND
03D9 DB00              IN    PORTA     ;
03DB E640              ANI   CVMSK     ; WAS THE PHOTO EYE TRIPPED?
03DD CAD903            JZ    WCONVT    ; NO JMP BACK AND WAIT
03E0 325510            STA   CONVRT    ; YES, GO WAIT FOR CONVERSION
03E3 C2A800            JMP   ADSVC     ;   TO BE COMPLETED.  IT WILL BE
                                       ;   STARTED BY THE NEXT RISING
                                       ;   (OR FALLING?) EDGE.

;
                       ;
                       ;
                       ;  THIS ROUTINE SERVICES THE PULSE FROM THE ENCODER.
                       ;     IT INCRMNTS EACH CNT.
                       ;
0038                   ORG   0038H
               PULSE
0038 F5                PUSH  PSW
0039 C5                PUSH  B         ; SAVE ALL REGISTERS.
003A D5                PUSH  D
003B E5                PUSH  H
003C 3A5510            LDA   CONVRT    ; ARE WE TAKING WT SAMPLES?
003F B7                ORA   A         ;
0040 CA4D00            JZ    PULS1     ; JMP IF NO
0043 3EFE              MVI   A,GOAD    ; START A/D CONVERSION
0045 D300              OUT   PORTC     ;
0047 AF                XRA   A         ;
0048 2F                CMA             ;
0049 D300              OUT   PORTC     ; RESET A/D FOR NEXT TIME
004B D302              OUT   PORTE     ; ZERO DISPLAY
004D DB00   PULS1:     IN    PORTA     ; IS THIS A FALLING EDGE?
004F E608              ANI   MSK5      ; IF YES, DO NOT DECREMENT CNT LOCATIONS.
```

```
0051 C28700            JNZ    RETI      ;
0054 212310            LXI    H,NUMBIN  ; LOAD # OF BINS
0057 4E                MOV    C,M       ;       INTO REG. C.
0058 119D0F            LXI    D,BIN1-OFST1+1 ; INIT. DE TO BIN1 -OFST1.
             LOOP1:                     ; THIS IS REPEATED FOR EACH BIN.
005B 216400            LXI    H,OFST1   ; GO TO NEXT BIN.
005E 19                DAD    D         ;
005F 46                MOV    B,M       ; B GETS THE # OF APPLES ON BELT HEADED
                                        ;      FOR THIS BIN.
0060 AF                XRA    A         ; ZERO A.
0061 54                MOV    D,H       ;
0062 5D                MOV    E,L       ; SAVE POINTER.
0063 B8                CMP    B         ; GO TO NEXT BIN IF NOTHING HERE.
0064 CA8300            JZ     LP3A      ;
0067 23       LP1A:    INX    H         ; INCREMNT CNT LOCATION.
             LOOP2:                     ; THIS IS REPEATED FOR EACH APPLE
0068 BE                CMP    M         ;      FOR THIS BIN.
0069 CA8D00            JZ     DO1       ; GO TO NEXT LOCATION IF CNT = 0.
006C D5       LP2A:    PUSH   D         ; SAVE D.
006D 56                MOV    D,M       ; LOAD DE WITH CNT.
006E 23                INX    H
006F 5E                MOV    E,M
0070 1B                DCX    D         ; DECRMNT CNT.
0071 BB                CMP    E         ; CNTL ZERO?
0072 C27900            JNZ    LP2B      ; NO, CONTINUE.
0075 BA                CMP    D         ; CNTH ZERO?
0076 CA9600            JZ     ENBLO     ; CNT IS ZERO, GO EJECT APPLE.
0079 73       LP2B:    MOV    M,E       ; STORE NEW CNT.
007A 2B                DCX    H
007B 72                MOV    M,D
007C 23                INX    H         ; HL=HL+2
007D D1                POP    D         ; RESTORE DE.
007E 23       LOOP3:   INX    H
007F 05                DCR    B         ; ONE MORE CNT INCREMNTED.
0080 C26800            JNZ    LOOP2     ; ARE ALL CNTS INCRMNTED?
0083 0D       LP3A:    DCR    C         ; ONE MORE BIN FINISHED.
0084 C25B00            JNZ    LOOP1     ; ARE WE THROUGH?
0087 E1       RETI:    POP    H         ; FINISHED!!
0088 D1                POP    D
0089 C1                POP    B
008A F1                POP    PSW       ; FINISHED RESTORING DATA.
008B FB                EI               ; ENABLE INTERRUPT.
008C C9                RET              ; RETURN FROM INTERRUPT.
             ;
             ;
             DO1:                       ; MAKE SURE BOTH BYTES ARE ZERO.
008D 23                INX    H
008E BE                CMP    M
008F CA6700            JZ     LP1A      ; BOTH ZERO GO TO NEXT LOCATION.
0092 2B                DCX    H         ; LOCATION HAS A CNT IN IT.
0093 C36C00            JMP    LP2A      ; GO BACK AND DECREMNT IT.
             ;
             ;
             ;   THIS ENABLES THE ONE SHOTS.
             ;
0096 77       ENBLO    MOV    M,A       ; CNT GETS ZERO.
0097 D1                POP    D         ; RESTORE DE.
0098 EB                XCHG             ; PUT ADDRESS OF PRESENT BIN# IN HL.
0099 35                DCR    M         ; ONE LESS APPLE ON BELT.
009A 2B                DCX    H         ; MOVE POINTER TO PICK UP
009B 7E                MOV    A,M       ;       ENABLE BYTE.
009C D300              OUT    PORTC     ; TRIGGER ONE-SHOT.
009E AF                XRA    A         ; ZERO A.
009F 23                INX    H         ; RESTORE DE AND HL TO WHAT THEY
00A0 EB                XCHG             ;       WERE BEFORE ENBL ROUTINE.
00A1 2F                CMA              ; MUST OUT 1 (0 RST ONE SHOT).
00A2 D300              OUT    PORTC     ; RESET TRIGGER TO ONE SHOT.
00A4 AF                XRA    A         ; ZERO A BACK AGAIN.
00A5 C37E00            JMP    LOOP3     ; GO BACK TO DCRMNTING CNTS.
             ;
             ;
             ;   THIS ROUTINE PROCESS DATA FROM THE A/D CONVRTER.
             ;       IT PUTS THE CORRECT CNT IN THE TABLE FOR THE PROPER BIN.
```

```
                ADSVC:
00A8 DB00               IN      PORTA   ; READ IN STATUS BIT.
00AA 07                 RLC             ; PUT STATUS IN CARRY.
00AB D2A800             JNC     ADSVC   ; LOOP UNTIL NEW DATA.
                ;
                ; READ IN A/D DATA, COMPARE IT AND PUT
                ;   THE PROPER CNT IN THE PROPER SEQUENCE.
                ;
00AE F3                 DI
00AF 3E17               MVI     A,ENBLAD ; ENABLE A/D AND RESET
00B1 D301               OUT     PORTD   ;    STATUS BIT AT SAME TIME.

00B3 DB01       ADS1:   IN      PORTB   ; READ IN A/D DATA
00B5 FB                 EI
00B6 47                 MOV     B,A     ; SAVE DATA
00B7 3E07               MVI     A,RDY   ; RESET FOR NEW DATA
00B9 D301               OUT     PORTD   ;
00BB 3A5410             LDA     COUNT   ; SEE HOW MANY WTS TAKEN
00BE 3C                 INR     A       ; ONE MORE WT
00BF 4F                 MOV     C,A     ; STORE WT COUNT IN REG C
00C0 325410             STA     COUNT   ; AND IN MEMORY
00C3 2610               MVI     H,WTBLH ; HIGH ADDR OF WT AVG TBLE
00C5 C656               ADI     WTBLL   ; CALC. LOW ADDR
00C7 6F                 MOV     L,A     ; (ASSUME NO PAGE CROSSED)
00C8 70                 MOV     M,B     ; STORE NEW WT IN TBLE
00C9 3E08               MVI     A,8     ; CK TO SEE IF THIS
00CB A1                 ANA     C       ; IS THE LAST COUNT
00CC CAA800             JZ      ADSVC   ; JMP IF NOT

ADAVG:
00CF AF                 XRA     A       ; ZERO A
00D0 325510             STA     CONVRT  ; ZERO CONVRT COMMAND
00D3 325410             STA     COUNT   ; ZERO COUNT
00D6 57                 MOV     D,A     ; ZERO REG D
00D7 78                 MOV     A,B     ; RESTORE A/D DATA

AVG1:
00D8 0D                 DCR     C       ; ONE LESS WT
00D9 CAE500             JZ      AVG2    ; IS THIS THE LAST ?

00DC 2B                 DCX     H       ; GO TO NEXT WT
00DD 86                 ADD     M       ; ADD THIS TO TOTAL WT
00DE D2D800             JNC     AVG1    ; JMP IF NO CARRY
00E1 14                 INR     D       ; ADD 1 TO HIGH BYTE TOTAL
00E2 C2D800             JMP     AVG1    ; LOOP AGAIN

AVG2:                   ; DIVIDE HIGH THEN LOW BY 2 UNTIL
                                        ; DIV COMPLETE.  IGNORE CARRYS INTO HIGH
00E5 4F                 MOV     C,A     ; STORE LOW WT TOTAL IN C
00E6 7A                 MOV     A,D     ; MOV HIG WT TOTAL INTO A
00E7 1F                 RAR             ;
00E8 57                 MOV     D,A     ;
00E9 79                 MOV     A,C     ;
00EA 1F                 RAR             ; TOTAL DIVIDED BY 2
00EB 4F                 MOV     C,A     ;
00EC 7A                 MOV     A,D     ;
00ED 1F                 RAR             ;
00EE 57                 MOV     D,A     ;
00EF 79                 MOV     A,C     ;
00F0 1F                 RAR             ; TOTAL DIVIDED BY 4
00F1 4F                 MOV     C,A     ;
00F2 7A                 MOV     A,D     ;
00F3 1F                 RAR             ;
00F4 79                 MOV     A,C     ;
00F5 1F                 RAR             ; TOTAL DIVIDED BY 8
00F6 D2FA00             JNC     AVG3    ;
00F9 3C                 INR     A       ; ROUND UP IF NECESSARY
00FA 2F         AVG3:   CMA             ;
00FB D302               OUT     PORTE   ; DISPLAY DATA
00FD 2F                 CMA             ; RECOVER TRUE DATA

00FE 212310             LXI     H,NUMBIN ; LOAD C WITH THE
0101 4E                 MOV     C,M     ;    # OF BINS.
```

```
0102 212410              LXI  H,HIGH    ; PUT HIGH ADDR IN HL.
0105 112C10              LXI  D,LOW     ; PUT LOW ADDR IN DE.
            COMPR:
0108 C5                  PUSH B         ; SAVE # OF BINS IN REG. C.
0109 BE                  CMP  M         ; IS DATA BIGGER THAN HIGH.
010A EB                  XCHG
010B D23A01              JNC  ICRN      ; DATA TOO BIG.
010E BE                  CMP  M         ; IS DATA LT OR EQ TO LOW?
010F DA3A01              JC   ICRN      ; DATA IS TOO SMALL, TRY AGAIN.
0112 110800              LXI  D,OFSET   ; DATA FITS.
0115 19                  DAD  D         ;    GET CNT.
0116 46                  MOV  B,M       ; B GETS CNT.
0117 19                  DAD  D         ; MOVE CNT HIGH BYTE INTO REG.
0118 4E                  MOV  C,M       ;
0119 C5                  PUSH B         ; SAVE BC.
011A 19                  DAD  D         ; SET POINTER TO CORRECT BIN.
011B 46                  MOV  B,M       ; BC GETS BIN ADDR.
011C 19                  DAD  D         ;
011D 4E                  MOV  C,M
011E C5                  PUSH B         ; PUT BC
011F E1                  POP  H         ;    INTO HL.
0120 C1                  POP  B         ; BC GETS CNT.
0121 F3                  DI             ; STOP PULSE UNTIL FINISHED LOADING TBL.
0122 34                  INR  M         ; ONE MORE APPLE FOR THIS BIN.
0123 AF                  XRA  A         ; ZERO A.
            PUTIN:                      ;DO UNTIL CNT IS PLACED IN EMPTY SLOT.
0124 23                  INX  H         ; GO TO NEXT SLOT.
0125 BE                  CMP  M         ; IS THIS SLOT EMPTY?
0126 CA2D01              JZ   PCNT      ; YES, GO STORE CNT.
0129 23                  INX  H         ; NOT EMPTY LOOK SOME MORE.
012A C32401              JMP  PUTIN     ; GO AGAIN.
                         ;
012D 23      PCNT:       INX  H         ; COMPARE 2ND BYTE.
012E BE                  CMP  M         ;
012F C22401              JNZ  PUTIN     ;
0132 71                  MOV  M,C       ; STORE CNT AND RETURN
0133 2B                  DCX  H
0134 70                  MOV  M,B
0135 C1                  POP  B         ; RESTORE # OF BINS.
0136 FB                  EI             ; LET PULSE CONTINUE.
0137 C3D903              JMP  WCONVT    ;    TO START.
                         ;
                         ;
013A 23      ICRN:       INX  H         ; INCRMNT HL.
013B 13                  INX  D         ; INCRMNT DE.
013C EB                  XCHG
013D C1                  POP  B         ; RESTORE # OF BINS.
013E 0D                  DCR  C         ; IS THIS THE LAST BIN?
013F C20801              JNZ  COMPR     ; NO, GO TO NEXT BIN.
0142 C3D903              JMP  WCONVT    ; YES, GO TO BEGINING.
                         ;
                         ;
                         ;
                         ; COUNT TABLE.
                         ;
                         ;
0200                     ORG  0200H
                         ;
0200 00      DISTBL:     DB   00
0201 02                  DB   02
0202 04                  DB   04
0203 06                  DB   06
0204 08                  DB   8
0205 0A                  DB   10
0206 0C                  DB   12
0207 0E                  DB   14
0208 10                  DB   16
0209 12                  DB   18
020A                     DS   6
0210 14                  DB   20
0211 16                  DB   22
0212 18                  DB   24
0213 1A                  DB   26
```

```
0214 1C      DB 28
0215 1E      DB 30
0216 20      DB 32
0217 22      DB 34
0218 24      DB 36
0219 26      DB 38
021A         DS 6
0220 28      DB 40
0221 2A      DB 42
0222 2C      DB 44
0223 2E      DB 46
0224 30      DB 48
0225 32      DB 50
0226 34      DB 52
0227 36      DB 54
0228 38      DB 56
0229 3A      DB 58
022A         DS 6
0230 3C      DB 60
0231 3E      DB 62
0232 40      DB 64
0233 42      DB 66
0234 44      DB 68
0235 46      DB 70
0236 48      DB 72
0237 4A      DB 74
0238 4C      DB 76
0239 4E      DB 78
023A         DS 6
0240 50      DB 80
0241 52      DB 82
0242 54      DB 84
0243 56      DB 86
0244 58      DB 88
0245 5A      DB 90
0246 5C      DB 92
0247 5E      DB 94
0248 60      DB 96
0249 62      DB 98
024A         DS 6
0250 64      DB 100
0251 66      DB 102
0252 68      DB 104
0253 6A      DB 106
0254 6C      DB 108
0255 6E      DB 110
0256 70      DB 112
0257 72      DB 114
0258 74      DB 116
0259 76      DB 118
025A         DS 6
0260 78      DB 120
0261 7A      DB 122
0262 7C      DB 124
0263 7E      DB 126
0264 80      DB 128
0265 82      DB 130
0266 84      DB 132
0267 86      DB 134
0268 88      DB 136
0269 8A      DB 138
026A         DS 6
0270 8C      DB 140
0271 8E      DB 142
0272 90      DB 144
0273 92      DB 146
0274 94      DB 148
0275 96      DB 150
0276 98      DB 152
0277 9A      DB 154
0278 9C      DB 156
0279 9E      DB 158
027A         DS 6
```

```
0280 A0              DB 160
0281 A2              DB 162
0282 A4              DB 164
0283 A6              DB 166
0284 A8              DB 168
0285 AA              DB 170
0286 AC              DB 172
0287 AE              DB 174
0288 B0              DB 176
0289 B2              DB 178
028A                 DS 6
0290 B4              DB 180
0291 B6              DB 182
0292 B8              DB 184
0293 BA              DB 186
0294 BC              DB 188
0295 BE              DB 190
0296 C0              DB 192
0297 C2              DB 194
0298 C4              DB 196
0299 C6              DB 198
                ;    BCD TO BINARY CONVERSION TABLE.
                ;
0400                 ORG 0400H
                ;
0400 00     BCDTBL:  DB 00
0401 01              DB 01
0402 02              DB 02
0403 03              DB 03
0404 04              DB 04
0405 05              DB 05
0406 06              DB 06
0407 07              DB 07
0408 08              DB 08
0409 09              DB 09
040A                 DS 6
0410 0A              DB 10
0411 0B              DB 11
0412 0C              DB 12
0413 0D              DB 13
0414 0E              DB 14
0415 0F              DB 15
0416 10              DB 16
0417 11              DB 17
0418 12              DB 18
0419 13              DB 19
041A                 DS 6
0420 14              DB 20
0421 15              DB 21
0422 16              DB 22
0423 17              DB 23
0424 18              DB 24
0425 19              DB 25
0426 1A              DB 26
0427 1B              DB 27
0428 1C              DB 28
0429 1D              DB 29
042A                 DS 6
0430 1E              DB 30
0431 1F              DB 31
0432 20              DB 32
0433 21              DB 33
0434 22              DB 34
0435 23              DB 35
0436 24              DB 36
0437 25              DB 37
0438 26              DB 38
0439 27              DB 39
043A                 DS 6
0440 28              DB 40
0441 29              DB 41
0442 2A              DB 42
0443 2B              DB 43
```

```
0444 2C       DB 44
0445 2D       DB 45
0446 2E       DB 46
0447 2F       DB 47
0448 30       DB 48
0449 31       DB 49
044A          DS 6
0450 32       DB 50
0451 33       DB 51
0452 34       DB 52
0453 35       DB 53
0454 36       DB 54
0455 37       DB 55
0456 38       DB 56
0457 39       DB 57
0458 3A       DB 58
0459 3B       DB 59
045A          DS 6
0460 3C       DB 60
0461 3D       DB 61
0462 3E       DB 62
0463 3F       DB 63
0464 40       DB 64
0465 41       DB 65
0466 42       DB 66
0467 43       DB 67
0468 44       DB 68
0469 45       DB 69
046A          DS 6
0470 46       DB 70
0471 47       DB 71
0472 48       DB 72
0473 49       DB 73
0474 4A       DB 74
0475 4B       DB 75
0476 4C       DB 76
0477 4D       DB 77
0478 4E       DB 78
0479 4F       DB 79
047A          DS 6
0480 50       DB 80
0481 51       DB 81
0482 52       DB 82
0483 53       DB 83
0484 54       DB 84
0485 55       DB 85
0486 56       DB 86
0487 57       DB 87
0488 58       DB 88
0489 59       DB 89
048A          DS 6
0490 5A       DB 90
0491 5B       DB 91
0492 5C       DB 92
0493 5D       DB 93
0494 5E       DB 94
0495 5F       DB 95
0496 60       DB 96
0497 61       DB 97
0498 62       DB 98
0499 63       DB 99
0000          END

ADAVG 00CF    ADS1  00B3    ADSVC 00A8    AVG1  00D8
AVG2  00E5    AVG3  00FA    BCDTB 0400    BIN1  1000
BIN2  1064    BIN3  10C8    BIN4  112C    BIN5  1190
BIN6  11F4    BIN7  1258    BIN8  12BC    BINE  1320
BINH  1044    BINL  104C    CNTH  1034    CNTL  103C
COMPR 0108    CONVR 1055    COUNT 1054    CVMSK 0040
DISTB 0200    DO1   008D    ENB1  007F    ENBD  002F
ENBH  008F    ENBL  004F    ENBLA 0017    ENBLO 0096
GOAD  00FE    HIGH  1024    HLD1  0022    HLD2  0025
HOLD  0020    ICRN  013A    LOAD  0365    LOAD1 037C
LOOP1 005B    LOOP2 0068    LOOP3 007E    LOP1  000C
```

| | | | | | | |
|---|---|---|---|---|---|---|
| LOP2 | 0011 | LOW | 102C | LP1A | 0067 | LP2A | 006C |
| LP2B | 0079 | LP3A | 0083 | MSK1 | 0007 | MSK2 | 0020 |
| MSK3 | 0008 | MSK4 | 0010 | MSK5 | 0008 | NRDY | 0008 |
| NUMBI | 1023 | OFSET | 0008 | OFST1 | 0064 | PCNT | 012D |
| PORTA | 0000 | PORTB | 0001 | PORTC | 0000 | PORTD | 0001 |
| PORTE | 0002 | PULS1 | 004D | PULSE | 0038 | PUTIN | 0124 |
| RDY | 0007 | RESET | 0300 | RETI | 0087 | RST1 | 030E |
| RST10 | 03D4 | RST2 | 032F | RST3 | 0344 | RST3A | 034D |
| RST4 | 0354 | RST4A | 035B | RST5 | 0362 | RST6 | 0383 |
| RST6A | 038A | RST7 | 0390 | RST7A | 0397 | RST8 | 039D |
| RST8A | 03A4 | RST9 | 03B8 | RST9A | 03C2 | S1RST | 0339 |
| WCONV | 03D9 | WTBLE | 1056 | WTBLH | 0010 | WTBLL | 0056 |

```
:100000003E08D301DB00E610CA0003F30E082157B7
:100010000107E2FD302CD20000230DC21100C30C008F
:100020000608110000100C225001402250005C222CA
:100030000000C9FFFFFFFFFFFFFF5C5D5E53A5510B733
:1000400000CA4D003EFED300AF2FD300D302DB00E643
:100050000008C287002123104E119D0F21640019460C
:10006000AF545DB8CA830023BECA8D00D556235E47
:100070001BBBC27900BACA9600732B7223D1230529
:10008000C268000DC25B00E1D1C1F1FBC923BECA49
:1000900067002BC36C0077D1EB352B7ED300AF23E9
:1000A000EB2FD300AFC37E00DB0007D2A800F33EE6
:1000B00017D301DB01FB473E07D30013A54103C4FF5
:1000C0003254102610C6566F703E08A1CAA800AF61
:1000D00032551032541057780DCAE5002B86D2D80D
:1000E000014C3D8004F7A1F577791F4F7A1F5779D2
:1000F0001F4F7A1F791FD2FA003C2FD3022F2123E2
:10010000104E212410112C10C5BEEBD23A01BEDADC
:100110003A01110800194619ACE519A619ACE5E194
:10012000C1F334AF23BECA2D0123C3240123BEC2B1
:10013000024017127B0C1FBC3D9032313EBC10DC282
:100140000801C3D903FFFFFFFFFFFFFFFFFFFFFF12
:10015000FFFFFFFFFFFFFFFFFFFFFFFFFFFFFFFFAF
:10016000FFFFFFFFFFFFFFFFFFFFFFFFFFFFFFFF9F
:10017000FFFFFFFFFFFFFFFFFFFFFFFFFFFFFFFF8F
:10018000FFFFFFFFFFFFFFFFFFFFFFFFFFFFFFFF7F
:10019000FFFFFFFFFFFFFFFFFFFFFFFFFFFFFFFF6F
:1001A000FFFFFFFFFFFFFFFFFFFFFFFFFFFFFFFF5F
:1001B000FFFFFFFFFFFFFFFFFFFFFFFFFFFFFFFF4F
:1001C000FFFFFFFFFFFFFFFFFFFFFFFFFFFFFFFF3F
:1001D000FFFFFFFFFFFFFFFFFFFFFFFFFFFFFFFF2F
:1001E000FFFFFFFFFFFFFFFFFFFFFFFFFFFFFFFF1F
:1001F000FFFFFFFFFFFFFFFFFFFFFFFFFFFFFFFF0F
:10020000000204060800A0C0E1012FFFFFFFFFFF9A
:100210001416181A1C1E20222426FFFFFFFFFFFFC2
:10022000282A2C2E30323436383AFFFFFFFFFFFFEA
:100230003C3E40424446484A4C4EFFFFFFFFFFFF12
:100240005052545658585A5C5E6062FFFFFFFFFF3A
:10025000646668686A6C6E70727476FFFFFFFFFF62
:10026000787A7C7E80828486888AFFFFFFFFFFFF8A
:100270008C8E90929496989A9C9EFFFFFFFFFFFFB2
:10028000A0A2A4A6A8AAACAEB0B2FFFFFFFFFFFFDA
:10029000B4B6B8BABCBEC0C2C4C6FFFFFFFFFFFF02
:1002A000FFFFFFFFFFFFFFFFFFFFFFFFFFFFFFFF5E
:1002B000FFFFFFFFFFFFFFFFFFFFFFFFFFFFFFFF4E
:1002C000FFFFFFFFFFFFFFFFFFFFFFFFFFFFFFFF3E
:1002D000FFFFFFFFFFFFFFFFFFFFFFFFFFFFFFFF2E
:1002E000FFFFFFFFFFFFFFFFFFFFFFFFFFFFFFFF1E
:1002F000FFFFFFFFFFFFFFFFFFFFFFFFFFFFFFFF0E
:10030000F3AF2FD300D302110004210010AF7723E5
:100310001BBBC20E03BAC20E0321FF13F9DB002F71
:10032000E607322310474F3E7F210010116400770B
:10033000190F05C22F03C34403E5EB16005F19EB49
:10034000E1230DC9413E64214410110011072CD39E1
:100350003C24D0311611048214C1073CD3903C263
:100360005B03C38303D301E521000040B012F6F6628
:10037000DB00E620FE207CCA7C03C664E1772315FF
:100380007A0DC93E8F5748212410CD6503C28A03D8
:100390003E4F5748212C10CD6503C297033E2F577F
:1003A00048213C10D301E521002DB012F6F7EE1E3
:1003B0007723157A0DC2A40378212C1011341001G3
:1003C00000000E56E260009444DE171EB70EB23134C
:1003D0003DC2C2033E07D301FBDB00E640CAD9039E
:1003E00032551003A800FFFFFFFFFFFFFFFFFFFF15
:1003F000FFFFFFFFFFFFFFFFFFFFFFFFFFFFFFFF0D
```

I claim:

1. An article weighing machine for weighing and sorting according to weight ranges, articles of fruit or vegetables comprising:
   (a) a feed conveyor for conveying spaced successive articles on said conveyor along a prescribed path through a weighing zone;
   (b) sensing means for sensing the presence of each article in said path;
   (c) weighing means in said weighing zone for weighing said successive articles;
   (d) gate means connected to said weighing means for ejecting the articles from said feed conveyor at different locations along said path;
   (e) counting means connected to said conveyor for providing clock signals proportional in number to the distance travelled by said conveyor; and
   (f) random access computer means having weight ranges written into its memory, said computer means being connected to said weighing means and said gate means and said counting means and said sensing means, said computer being actuated by said sensing means and said weighing means for accessing the memory for the distances which the respective articles are to travel along said path and for actuating the ejecting operation of selected gate means, according to the weight of the respective articles when the clock pulses indicate tht such distances have been travelled by such articles, so as to eject articles within a similar first weight range in one location along said path and articles within a similar second weight range in another location.

2. The article weighing machine defined in claim 1 wherein said random access computer includes:
   (a) a microprocessor connected electrically for actuating respectively said gates;
   (b) a first memory means connected to said microprocessor for providing a circular list on which high and low weight settings for each gate are stored and for prescribing different numbers clock pulses for causing actuation of the respective gates;
   (c) said weighing means having means for generating an analog signal proportional to the weight received by said weighing means and for converting such analog signal to digital form; and
   (d) means for enabling said computer to receive such digital signals and to address said memory means so as to prescribe the number of clock pulses from the memory which will actuate a prescribed gate.

3. The article weighing machine defined in claim 2 including a second feed conveyor disposed parallel to the first mentioned feed conveyor for receiving and conveying successive spaced articles thereon along a second prescribed path parallel to the first mentioned prescribed path and through a second weighing zone, sensing means for sensing the presence of each article in said second path and weighing means in said weighing zone for weighing said successive article in said second path, gate means connected to the second weighing means for ejecting articles from said second feed conveyor at different locations along said second path, said computer means also counting the distance which the respective articles travel along the said second path for actuating the ejection operation of selected second gate means.

4. The article weighing machine defined in claim 3 wherein said feed conveyor includes a belt, the upper flight of which is moved along said prescribed path for conveying said successive articles and slide means for supporting said belt in said path.

5. The article weighing machine defined in claim 4 wherein said slide member supports said belt in an upwardly, transversely concaved condition so as to maintain the articles centrally on said belt.

6. The article weighing machine defined in claim 5 wherein said gate means include a plurality of longitudinally spaced nozzles disposed adjacent the side of said belt for directing air laterally thereacross for impinging upon the articles adjacent thereto to eject the same laterally from the belt.

7. The article weighing machine defined in claim 6 including a plurality of discharge conveyors arranged successively beneath said upper flight of said belts and arranged respectively with respect to said nozzles for receiving the articles ejected laterally by the nozzles.

8. The article weighing machine defined in claim 2 including a metering assembly disposed above said conveyor for feeding said articles successively to said conveyor and for metering the distance between adjacent articles so as to evenly space such articles on said conveyor.

9. The article weighing machine defined in claim 8 in which said metering assembly includes a plurality of cup forming members which form a plurality of equally spaced cups moving in the direction of said conveyor and carrying successive articles in the direction of movement of said conveyor, said metering assembly moving with respect to each other for releasing said articles progressively onto said conveyor.

10. The article weighing machine defined in claim 2 including a metering assembly providing a plurality of advancing cups disposed over said feed conveyor, each cup having parts movable away from each other for discharging successive articles carried by successive cups onto said conveyor means for synchronizing the feed of said metering assembly and said conveyor so that the cups of said metering assembly travel at a slower speed than said feed conveyor.

11. The article weighing device described in claim 2 including a metering assembly disposed over the end portion of said feed conveyor, said metering assembly including an opposed pair of metering conveyors the inner flights of which are parallel and move simultaneously in a direction of movement of said feed conveyors, fingers projecting outwardly from said metering conveyor, the fingers on the inner flights of said metering conveyors being in opposed relationship and moving away from each other at the end of the metering assembly, said fingers forming a plurality of advancing cups when in their opposed relationship for receiving successive articles and for advancing said articles toward said feed conveyor and for discharging said articles successively onto said feed conveyor as said fingers move away from each other.

12. The article weighing machine defined in claim 2 including a metering assembly disposed above the end portion of said feed conveyor and including opposed fingers and opposed continuous metering conveyors having inner parallel flights and outer flights, said metering conveyors carrying said fingers for moving said fingers laterally toward each other for beginning the inner flights to form successive caps for moving said articles toward a discharge end of said metering assembly and for moving said fingers laterally away from each other for discharging said articles successively from said discharge end onto said feed conveyor and a rotary brush disposed above the discharge end of said metering assembly for cooperating with said discharge end of said metering assembly in positioning said articles in equally spaced successive relationship on said feed conveyor.

13. The article weighing machine defined in claim 2 wherein said gates are spaced longitudinally along said prescribed path downstream from said weighing means and wherein said gate means transfer said articles laterally from said feed conveyor.

14. The article weighing machine defined in claim 13 including a plurality of laterally conveying successively disposed discharge conveyors respectively associated with said gate means for conveying the articles discharged laterally from said feed conveyor in separate paths.

15. The article weighing machine defined in claim 1 in which said weighing means includes the weighing cell disposed beneath a portion of the feed conveyor and detecting the weight of articles as they are moved thereover by said feed conveyor, said weighing cell being electrically connected to said gate means for dictating which of said gate means is actuated in response to the weight detected for the articles.

16. The article weighing machine defined in claim 15 wherein said gate means includes a plurality of longitudinally spaced nozzles disposed adjacent one side of said feed conveyor, means, a source of compressed air connected to all of said nozzles, valve means for respectively controlling the feed of compressed air to said nozzles, said weighing means and said counting means being electrically connected to said valve means for dictating which of said valve means will be actuated when prescribed articles of prescribed weights are positioned adjacent thereto, each of said nozzles directing compressed air laterally across said conveyor means when its associated valve means is actuated for causing air to impinge upon the article position adjacent thereto and for ejecting such article laterally from said conveyor means.

17. The article weighing machine defined in claim 16 wherein said feed conveyor is a belt which is upwardly concaved for retaining the articles thereon.

18. The article weighing machine defined in claim 2 wherein said sensing means includes a source of light and a photo sensor in a position for detecting each of said articles as it is moved on said feed conveyor and wherein said weighing means is electrically connected to said sensing means for being actuated the detection by said sensing means of an article in said weighing zone on said feed conveyor.

19. The article weighing machine defined in claim 1 including a metering assembly, said metering assembly comprising a pair of horizontally disposed continuous chains extending in a plane above the end portion of said conveyor, said chains having parallel disposed inner flights, a plurality of juxtaposed fingers disposed on said chains, the fingers extending inwardly toward each other and over said feed conveyor along the inner flights of said chains, means for driving said chains and said feed belt in synchronized relationship, with said feed conveyor traveling faster than said chains, said fingers on the inner flights of said chains projecting toward each other and forming successive cups for receiving successive articles, said fingers diverging from each other toward the ends of travel of the inner flights said chains for releasing said articles successively onto said feed conveyor.

20. The article weighing machine defined in claim 19 including a pair of brushes disposed respectively over the entrance end and the exit end of said metering assembly, the lower portions of said brushes cooperating with the entrance end and the exit end respectively of said metering assemblies for feeding articles successively onto said metering assembly and off of said metering assembly.

21. An article weighing machine for weighing and sorting according to weight ranges, articles of fruit or vegetables comprising:
(a) a feed conveyor for conveying spaced successive articles on said conveyor along a prescribed path through a weighing zone;
(b) sensing means for sensing the presence of each article in said path;
(c) weighing means in said weighing zone for weighing said successive articles;
(d) gate means connected to said weighing means for ejecting the articles from said feed conveyor at different locations along said path;
(e) counting means connected to said weighing means and said gate means for counting the distances which the respective articles travel along said path for actuating the ejecting operation of selected gate means, according to the weight of the respective articles, so as to eject articles within a similar first weight range in one location along said path and articles within a similar second weight range in another location; and
(f) a metering assembly disposed over the end portion of said feed conveyor, said metering assembly including an opposed pair of metering conveyors the inner flights of which are parallel and move simultaneously in a direction of movement of said feed conveyors, fingers projecting outwardly from said metering conveyor, the fingers on the inner flights of said metering cconveyors being in opposed relationship and moving away from each other at the end of the metering assembly, said fingers forming a plurality of advancing cups when in their opposed relationship for receiving successive articles and for advancing said articles toward said feed conveyor and for discharging said articles successively onto said feed conveyor as said fingers move away from each other;
(g) alternate of said fingers having partitions which form the advance side of one cup and the rear side of the next adjacent cup.

22. An article weighing machine for weighing and sorting according to weight ranges, articles of fruit or vegetables comprising:
(a) a feed conveyor for conveying spaced successive articles on said conveyor along a prescribed path through a weighing zone;
(b) sensing means for sensing the presence of each article in said path;
(c) weighing means in said weighing zone for weighing said successive articles;
(d) gate means connected to said weighing means for ejecting the articles from said feed conveyor at different locations along said path; said gate means being spaced longitudinally along said prescribed path downstream from said weighing means, said gate means transferring said articles laterally from said feed conveyor;

(e) counting means connected to said weighing means and said gate means for counting the distances which the respective articles travel along said path for actuating the ejecting operation of selected gate means, according to the weight of the respective articles, so as to eject articles within a similar first weight range in one location along said path and articles within a similar second weight range in another location; and (f) a plurality of laterally conveying successively disposed discharge conveyors respectively associated with said gate means for conveying the articles discharged laterally from said conveyor in separate paths; and (g) a plurality of flexible skirts disposed adjacent to said feed conveyor and respectively over said discharge conveyors for forming chutes along which said articles travel after being discharged from said feed conveyor.

23. The article weighing machine defined in claim 22 including flexible baffles respectively cooperating with said skirts and defining with said skirts a passageway for said articles when the same are discharged from said feed conveyor, said baffles arresting lateral movement of said article, said skirts and said articles being sufficiently flexible that articles may pass therebeneath for being carried by said discharge conveyors.

24. An article weighing machine for weighing and sorting according to weight ranges, articles of fruit or vegetables comprising:
(a) a feed conveyor for conveying spaced successive articles on said conveyor along a prescribed path through a weighing zone;
(b) sensing means for sensing the presence of each article in said path;
(c) weighing means in said weighing zone for weighing said successive articles;
(d) gate means connected to said weighing means for ejecting the articles from said feed conveyor at different locations along said path;
(e) counting means connected to said weighing means and said gate means for counting the distances which the respective articles travel along said path for actuating the ejecting operation of selected gate means, according to the weight of the respective articles, so as to eject articles within a similar first weight range in one location along said path and articles within a similar second weight range in another location;
(f) said sensing means including a source of light and a photo sensor in a position for detecting each of said articles as it is moved on said feed conveyor, said weighing means being electrically connected to said sensing means for being actuated by the detection by said sensing means of an article in said weighing zone on said feed conveyor; and
(g) said counting means being actuated by said sensing means for repeatedly weighing each of said successive articles and for averaging the weight thereof.

25. The weighing machine defined in claim 24 wherein said gate means includes successive nozzles disposed adjacent to the path of travel of said articles for directing air selectively against said articles sufficient to discharge said articles laterally.

26. An article weighing machine for weighing and sorting according to weight ranges, articles of fruit or vegetables comprising:
(a) a feed conveyor for conveying spaced successive articles on said conveyor along a prescribed path through a weighing zone;
(b) sensing means for sensing the presence of each article in said path;
(c) weighing means in said weighing zone for weighing said successive articles;
(d) gate means connected to said weighing means for ejecting the articles from said feed conveyor at different locations along said path;
(e) counting means connected to said weighing means and said gate means for counting the distances which the respective articles travel along said path for actuating the ejecting operation of selected gate means, according to the weight of the respective articles, so as to eject articles within a similar first weight range in one location along said path and articles within a similar second weight range in another location;
(f) a metering assembly comprising a pair of horizontally disposed continuous chains extending in a plane above the end portion of said conveyor, said chains having parallel disposed inner flights, a plurality of juxtaposed fingers disposed on said chains, the fingers extending inwardly toward each other and over said feed conveyor along the inner flights of said chains, means for driving said chains and said feed belt in synchronized relationship, with said feed conveyor traveling faster than said chains, said fingers on the inner flights of said chains projecting toward each other and forming successive cups for receiving successive articles, said fingers diverging from each other toward the ends of travel of said chains for releasing said articles successively onto said feed conveyor;
(g) a pair of brushes disposed respectively over the entrance end and the exit end of said metering assembly, the lower portions of said brushes cooperating with the entrance end and the exit end respectively of said metering assemblies for feeding articles successively onto said metering assembly and off of said metering assembly; and
(h) a turntable disposed adjacent to the entrance end of said metering assembly; and
(i) rake means for guiding articles deposited on said turntable into said metering assembly upon rotation of said turntable.

27. An apparatus for sorting articles of fruits or vegetables according to physical characteristics, comprising:
(a) conveyor means for moving successive articles along a prescribed path;
(b) detecting means for sizing each of said articles according to similar physical characteristics;
(c) fluid directing means responsive to said detecting means and adjacent said path for directing fluid across said path and against selected of said articles which have similar characteristics for urging such selected articles into a different path than said prescribed path; and
(d) sensing means for sensing the speed of said conveyor, said fluid directing means being responsive to said sensing means for directing fluid across said path after said conveying means has conveyed said selected article a prescribed distance from said detecting means.

28. An apparatus for sorting articles of fruits or vegetables according to physical characteristics, comprising:
  (a) conveyor means for moving successive articles along a prescribed path;
  (b) detecting means for sizing each of said articles according to similar physical characteristics;
  (c) fluid directing means responsive to said detecting means and adjacent said path for directing fluid across said path and against selected of said articles which have similar characteristics for urging such selected articles into a different path than said prescribed path;
  (d) said fluid being air and said fluid directing means being an air nozzle positioned in a fixed position adjacent to one side of said conveying means for directing air in a transverse direction across said conveying means;
  (e) said fluid directing means including a plurality of additional air nozzles disposed at spaced locations along the length of said conveyor means, and means controlled by said detecting means for selectively actuating said additional air nozzles; and
  (f) sensing means for sensing the speed of said conveyor means and for cooperating with said detecting means in actuating a selected nozzle after the article has been carried a prescribed distance along said path to position said selected article adjacent to said selected nozzle.

29. The apparatus defined in claim 28 wherein said detecting means is a weight cell and including computer means for continuously storing the weight of each successive article, receiving the speed of said conveyor from sensing means, comparing each such weight with weight ranges set in said computer, calculating the distance for each article to travel along said path to be adjacent an appropriate nozzle dictated by a selected weight range within which is the weight of such article, and actuating said appropriate nozzle for ejecting such article from said conveyor.

30. The apparatus defined in claim 29 including metering means for placing successive articles in substantially equal spacing on said conveyor means.

31. An apparatus for sorting articles of fruits or vegetables according to physical characteristics, comprising:
  (a) conveyor means for moving successive articles along a prescribed path;
  (b) detecting means for sizing each of said articles according to similar physical characteristics;
  (c) fluid directing means responsive to said detecting means and adjacent said path for directing fluid across said path and against selected of said articles which have similar characteristics for urging such selected articles into a different path than said prescribed path, said fluid detecting means including a plurality of fluid nozzles disposed at spaced locations along the length of said conveyor means, and means controlled by said detecting means for selectively actuating said nozzles;
  (d) sensing means for sensing the speed of said conveyor means and for cooperating with said detecting means in actuating a selected nozzle after the article has been carried a prescribed distance along said path to a position said selected article adjacent to said selected nozzle;
  (e) said detecting means being a weight cell and including computer means for continuously storing the weight of each successive article, receiving the speed of said conveyor from sensing means, comparing each such weight with weight ranges set in said computer, calculating the distance for each article to travel along said path to be adjacent an appropriate nozzle dictated by a selected weight range within which is the weight of such article, and actuating said appropriate nozzle for ejecting such article from said conveyor;
  (f) metering means for placing successive articles in substantially equal spacing on said conveyor means; and
  (g) a turntable onto which said articles are placed and rake means for directing said articles from said turntable into said metering means.

32. The apparatus defined in claim 31 wherein said metering means includes continuous chains having their inner flights parallel to each other and parallel and above said conveyor means and juxtaposed fingers projecting outwardly from said chains and projecting toward each other along the inner flights of said chains for receiving said articles and for successively releasing them onto said conveyor means at the end of the travel of said inner flights.

33. The apparatus defined in claim 22 wherein alternate of said fingers include partitions defining along the inner flights of said chains upwardly opening, equally spaced, successive cups for respective receiving said articles.

34. The apparatus defined in claim 33 including inwardly and downwardly inclined flanges disposed on opposite sides of the cups formed by said fingers for directing articles toward said cups.

35. A process for weighing articles and for sorting such articles according to their weight comprising the steps of feeding said articles along a prescribed path through a weighing zone, successively sensing the presence of said articles in said weighing zone, weighing said article after the same has been sensed in said weighing zone, respectively generating digital signals in representative of the weights of said articles, generating clock pulses proportioned in numbers to the distances respectively travelled by said articles along said path of travel, starting signals in a random access memory which indicate the distances which articles of prescribed weights are to be fed along said path of travel before being discharged therefrom comparing the store signals and the digital signals for producing a signal for prescribing the distances to be traveled by such articles, discharging an article ejecting said article from said path of travel in response to the signal representing the prescribed weight for the prescribed article, ejecting other of said articles at other locations along their path of travel when a different weight signal is detected for said articles and collecting the articles according to their positions at which they were ejected.

* * * * *